United States Patent
Deng et al.

(10) Patent No.: US 11,638,026 B2
(45) Date of Patent: Apr. 25, 2023

(54) ALIGNMENT OF PREDICTION WEIGHTS IN VIDEO CODING

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Hongbin Liu, Beijing (CN); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/682,751

(22) Filed: Feb. 28, 2022

(65) Prior Publication Data
US 2022/0210460 A1 Jun. 30, 2022

Related U.S. Application Data

(63) Continuation of application No. PCT/CN2020/112779, filed on Sep. 1, 2020.

(30) Foreign Application Priority Data

Sep. 1, 2019 (WO) ................ PCT/CN2019/103903
Oct. 10, 2019 (WO) ................ PCT/CN2019/110490

(51) Int. Cl.
*H04N 19/186* (2014.01)
*H04N 19/51* (2014.01)
(Continued)

(52) U.S. Cl.
CPC .......... *H04N 19/51* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS

| 9,609,343 | B1 | 3/2017 | Chen et al. |
| 10,306,240 | B2 | 5/2019 | Xiu et al. |

(Continued)

FOREIGN PATENT DOCUMENTS

| CN | 102547290 A | 7/2012 |
| CN | 102884794 A | 1/2013 |

(Continued)

OTHER PUBLICATIONS

Blaser et al. "Description of SDR and 360° Video Coding Technology Proposal by RWTH Aachen University," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0023, 2018.

(Continued)

*Primary Examiner* — Christopher G Findley
(74) *Attorney, Agent, or Firm* — Perkins Coie LLP

(57) ABSTRACT

A method of video processing is described. The method includes determining chroma weights used for determining a chroma prediction block of a chroma block of a current block of a video by blending predictions of the chroma block according to a rule, and performing a conversion between the current block and a coded representation of the video according to the determining, wherein the rule specifies that the chroma weights are determined from luma weights of a (Continued)

collocated luma block of the current block; wherein the current block is coded with a geometric partitioning mode.

19 Claims, 17 Drawing Sheets

(51) Int. Cl.
    *H04N 19/105*     (2014.01)
    *H04N 19/119*     (2014.01)
    *H04N 19/132*     (2014.01)
    *H04N 19/137*     (2014.01)
    *H04N 19/176*     (2014.01)
    *H04N 19/70*     (2014.01)

(52) U.S. Cl.
    CPC ......... *H04N 19/132* (2014.11); *H04N 19/137* (2014.11); *H04N 19/176* (2014.11); *H04N 19/186* (2014.11); *H04N 19/70* (2014.11)

(56) References Cited

U.S. PATENT DOCUMENTS

| | | |
|---|---|---|
| 10,764,576 B2 | 9/2020 | Li et al. |
| 2012/0087412 A1 | 4/2012 | Chuang |
| 2012/0147961 A1 | 6/2012 | Guo et al. |
| 2013/0170562 A1 | 7/2013 | Van Der Auwera et al. |
| 2013/0195190 A1 | 8/2013 | Lee et al. |
| 2014/0307780 A1 | 10/2014 | Cohen et al. |
| 2017/0244966 A1 | 8/2017 | Joshi et al. |
| 2019/0238864 A1 | 8/2019 | Xiu et al. |
| 2020/0296389 A1* | 9/2020 | Wang .................. H04N 19/105 |
| 2020/0359016 A1 | 11/2020 | Li et al. |
| 2020/0359017 A1 | 11/2020 | Li et al. |
| 2020/0359018 A1 | 11/2020 | Li et al. |
| 2021/0092392 A1 | 3/2021 | Reuze et al. |
| 2021/0227206 A1 | 7/2021 | Chiu et al. |
| 2021/0227247 A1 | 7/2021 | Blaeser et al. |
| 2021/0250592 A1 | 8/2021 | Xiu et al. |
| 2021/0266587 A1 | 8/2021 | Liu et al. |
| 2021/0314569 A1 | 10/2021 | Ahn et al. |
| 2022/0224897 A1 | 7/2022 | Zhang et al. |
| 2022/0224923 A1 | 7/2022 | Filippov et al. |
| 2022/0256166 A1 | 8/2022 | Deng et al. |

FOREIGN PATENT DOCUMENTS

| | | |
|---|---|---|
| CN | 105580364 A | 5/2016 |
| CN | 105934948 A | 9/2016 |
| CN | 106028048 A | 10/2016 |
| CN | 106105227 A | 11/2016 |
| CN | 109327703 A | 2/2019 |
| CN | 110312127 A | 10/2019 |
| EP | 2747426 A2 | 6/2014 |
| EP | 3935844 A1 | 1/2022 |
| EP | 3939273 A1 | 1/2022 |
| EP | 4020987 A1 | 6/2022 |
| WO | 2013068562 A1 | 5/2013 |
| WO | 2018141416 A1 | 8/2018 |
| WO | 2019039323 A1 | 2/2019 |
| WO | 2019147910 A1 | 8/2019 |
| WO | 2019154936 A1 | 8/2019 |
| WO | 2019177429 A1 | 9/2019 |
| WO | 2019190181 A1 | 10/2019 |
| WO | 2020256377 A1 | 12/2020 |
| WO | 2020180155 A1 | 9/2022 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.

Deng et al. "Non-CE4: Alignment of Luma and Chroma Weights Calculation for TPM Blending," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0530, 2019.

Esenlik et al. "Non-CE4: Geometrical Partitioning for Inter Blocks," Joint Video Experts Team (JVET)of ITU-T SG 16 WP 3 and ISO/IEC JTC 1/SC 29/WG 1115th Meeting: Gothenburg, SE, Jul. 3-12, 2019, document JVET-O0489, 2019.

Esenlik et al. "Non-CE4: Adaptive Blending Filtering for TPM," Joint Video Experts Team (JVET) of ITU-T SG 16 WP 3 and ISO/IEC JTC 1/SC 29/WG 11 15th Meeting: Gothenburg, SE, Jul. 3-12, 2019. document JVET-O0513, 2019.

Gao et al. "CE4: CE4-1.1, CE4-1.2 and CE4-1.14: Geometric Merge Mode (GEO)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0068, 2019.

"Information Technology—High Efficiency Coding and Media Delivery in Heterogeneous Environments—Part 2: High Efficiency Video Coding" Apr. 20, 2018, ISO/DIS 23008, 4th Edition.

Liao et al. "CE10.3.1.b: Triangular Prediction Unit Mode," Joint Video Exploration Team (JVET) of ITU-T SG 16 WP 3 and ISO/IEC JTC 1/SC 29/WG 11 12th Meeting: Macao, CN, Oct. 3-12, 2018, document JVET-L0124, 2018.

Lin, Po-Han. "Non-CE4: Modification of MV Storage in Triangle Merge Mode," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0314, 2019.

Meng et al. "CE4-Related: Simplification of Motion Vector Storage Operation for Triangle Merge Mode," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0418, 2019.

Naser et al. "Non-CE6 / Non-CE3: On ISP and Maximum Transform Size," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0699, 2019.

Park et al. "CE10-Related: Simplification of Triangular Partitions," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0352, 2019.

Reuze et al. "Non-CE4: Simplification of Bi-Prediction MV Generation for Triangle Partition Mode Storage," Joint Video Experts Team (JVET) of ITU-T SG 16 WP 3 and ISO/IEC JTC 1/SC 29/WG 1115th Meeting: Gothenburg, SE, Jul. 3-12, 2019. document JVET-O0411, 2019.

Zhang et al. "Non-CE4: Simplified Motion Field Storage for TPM," Joint Video Experts Team (JVET) of ITU-T SG 16 WP 3 and ISO/IEC JTC 1/SC 29/WG 11 15th Meeting: Gothenburg, SE, Jul. 3-12, 2019. document JVET-00265, 2019.

Zhu et al. "Non-CE8: Disabling TPM Blending," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0563, 2019.

VTM software: https://vcgit.hhi.fraunhofer.de/jvet/VVCSoftware_VTM.git.

International Search Report and Written Opinion from International Patent Application No. PCT/CN2020/112779 dated Dec. 2, 2020 (12 pages).

International Search Report and Written Opinion from International Patent Application No. PCT/CN2020/112780 dated Nov. 30, 2020 (9 pages).

(56) References Cited

OTHER PUBLICATIONS

International Search Report and Written Opinion from International Patent Application No. PCT/CN2020/120112 dated Jan. 1, 2021 (10 pages).

International Search Report and Written Opinion from International Patent Application No. PCT/CN2020/120113 dated Jan. 4, 2021 (10 pages).

International Search Report and Written Opinion from International Patent Application No. PCT/CN2020/120114 dated Dec. 30, 2020 (9 pages).

International Search Report and Written Opinion from International Patent Application No. PCT/CN2020/120115 dated Jan. 12, 2021 (12 pages).

Non Final Office Action from U.S. Appl. No. 17/717,515 dated Aug. 4, 2022.

Deng et al. "CE4-1.14 Related: Block Size Limitation of Enabling TPM and GEO," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0663, 2019.

Sun et al. "CE4-related: On Simplification for GEO Weight Derivation," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0250, 2019.

Extended European Search Report from European Patent Application No. 20856664.6 dated Aug. 23, 2022 (12 pages).

Final Office Action from U.S. Appl. No. 17/717,515 dated Dec. 2, 2022.

\* cited by examiner

FIG. 9

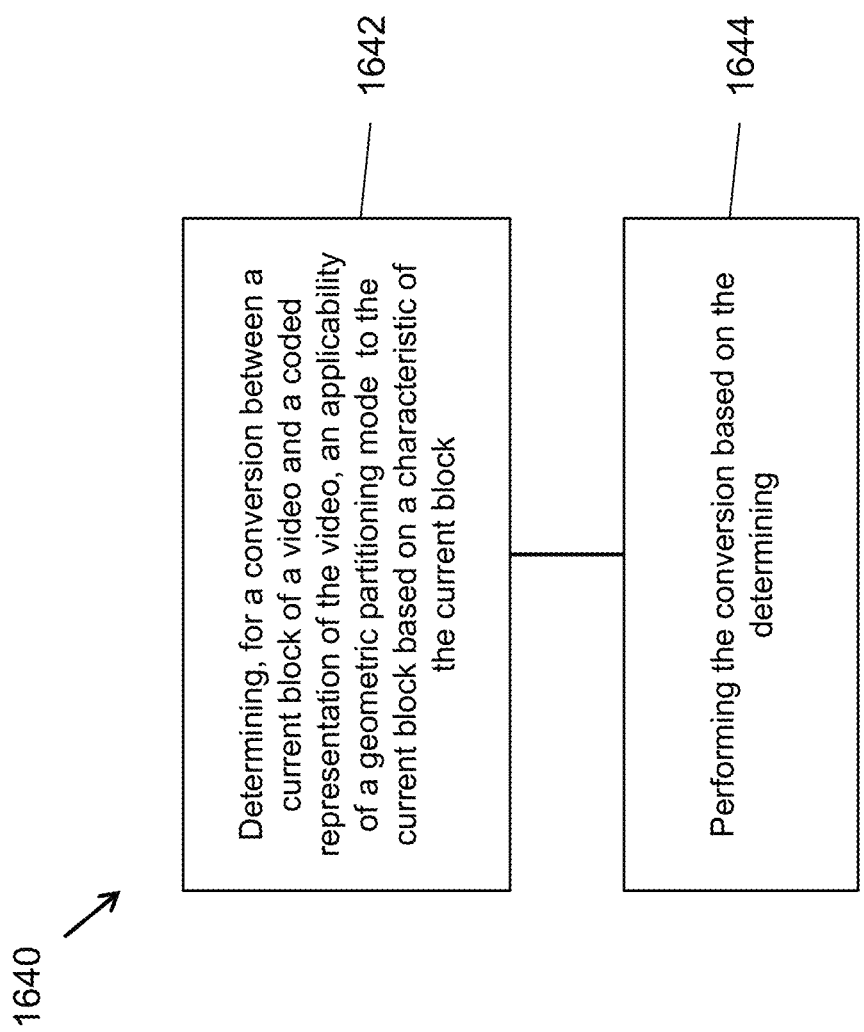

ALIGNMENT OF PREDICTION WEIGHTS IN VIDEO CODING

CROSS REFERENCE TO RELATED APPLICATIONS

This application is a continuation of International Patent Application No. PCT/CN2020/112779, filed on Sep. 1, 2020, which claims the priority to and benefits of International Patent Application No. PCT/CN2019/103903, filed on Sep. 1, 2019, and PCT/CN2019/110490, filed on Oct. 10, 2019. All the aforementioned patent applications are hereby incorporated by reference in their entireties.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which inter prediction is used with triangular or arbitrary geometry partitions of video blocks.

In one example aspect, a method of video processing is disclosed. The method includes determining chroma weights used for determining a chroma prediction block of a chroma block of a current block of a video by blending predictions of the chroma block according to a rule, and performing a conversion between the current block and a coded representation of the video according to the determining, wherein the rule specifies that the chroma weights are determined from luma weights of a collocated luma block of the current block; wherein the current block is coded with a geometric partitioning mode.

In another example aspect, another method of video processing is disclosed. The method includes determining chroma weights used for determining a chroma prediction block of a chroma block of a current block of a video by blending predictions of the chroma block according to a rule; and performing a conversion between the current block and a coded representation of the video according to the determining, wherein the rule is dependent on a characteristic of a collocated luma block and/or a characteristic of the current block, wherein the current block is coded with a geometric partitioning mode.

In another example aspect, another method of video processing is disclosed. The method includes performing a conversion between a current block of a video and a coded representation of the video, wherein, during the conversion, a prediction block for the current block is determined by blending predictions of the current block according to a blending weight mask, wherein the blending weigh mask is determined according to a rule; wherein the current block is coded with a geometric partitioning mode.

In another example aspect, another method of video processing is disclosed. The method includes determining, for a conversion between a current block of a video and a coded representation of the video, an applicability of a geometric partitioning mode to the current block based on a characteristic of the current block; and performing the conversion based on the determining.

In another example aspect, another method of video processing is disclosed. The method includes performing a conversion between a current block of a video and a coded representation of the video, wherein the coded representation conforms to a format rule that specifies that in case that a geometric partitioning mode is disabled for the current block during the conversion, a syntax element descriptive of the geometric partitioning mode is not included in the coded representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 9 shows an example weights setting for an 8×16 TPM prediction block.

FIGS. 16A to 16D show flowcharts for example methods of video processing.

DETAILED DESCRIPTION

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Summary

This document is related to video coding technologies. Specifically, it is about inter prediction and related techniques in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

2.1. Extended Merge Prediction

In VTM, the merge candidate list is constructed by including the following five types of candidates in order:
1) Spatial MVP from spatial neighbour CUs
2) Temporal MVP from collocated CUs
3) History-based MVP from an FIFO table
4) Pairwise average MVP
5) Zero MVs.

The size of merge list is signalled in slice header and the maximum allowed size of merge list is 6 in VTM. For each CU code in merge mode, an index of best merge candidate is encoded using truncated unary binarization (TU). The first bin of the merge index is coded with context and bypass coding is used for other bins.

The generation process of each category of merge candidates is provided in this session.

2.1.1. Spatial Candidates Derivation

Figure 1:
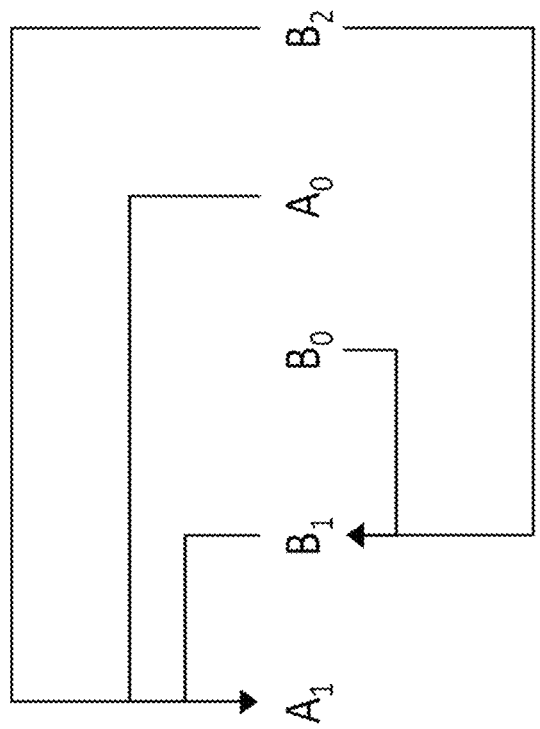
FIG. 1 shows example positions of spatial merge candidates.
Figure 2:
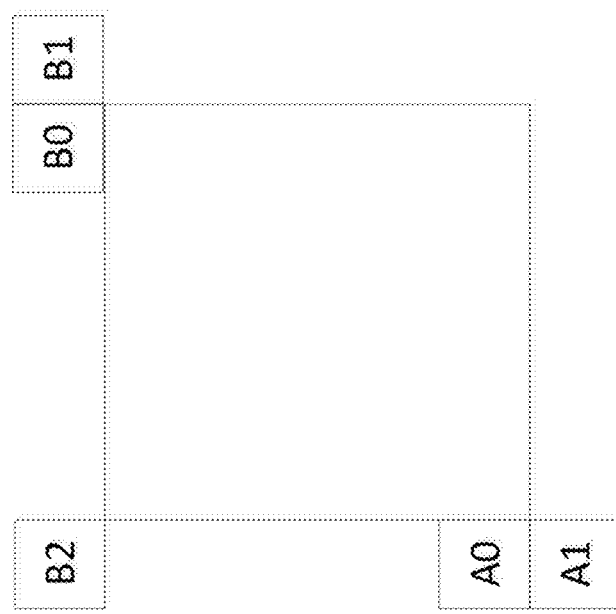
FIG. 2 shows examples of candidate pairs considered for redundancy check of spatial merge candidates.

The derivation of spatial merge candidates in VVC is same to that in HEVC. A maximum of four merge candidates are selected among candidates located in the positions depicted in FIG. 1. The order of derivation is $A_0$, $B_0$, $B_1$, $A_1$ and $B_2$. Position $B_2$ is considered only when any CU of position $A_0$, $B_0$, $B_1$, $A_1$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

2.1.2. Temporal Candidates Derivation

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 3:
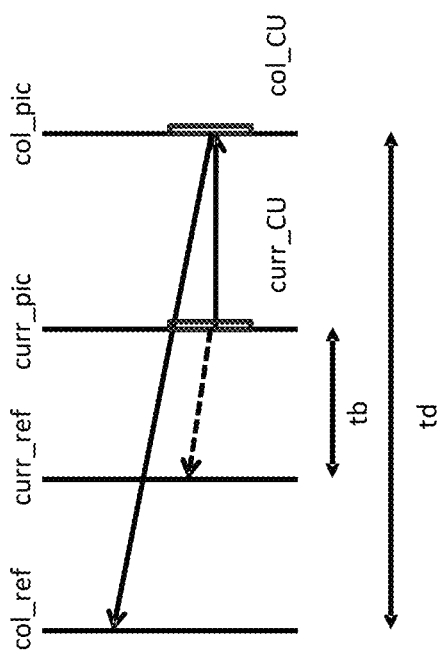
FIG. 3 is an illustration of motion vector scaling for temporal merge candidate.

FIG. 3 is an illustration of motion vector scaling for temporal merge candidate

Figure 4:
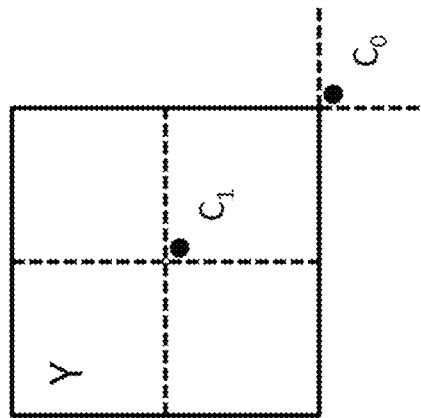
FIG. 4 shows examples of candidate positions for temporal merge candidate, C0 and C1.

The position for the temporal candidate is selected between candidates C0 and C1, as depicted in FIG. 4. If CU at position C0 is not available, is intra coded, or is outside of the current row of CTUs, position C1 is used. Otherwise, position C0 is used in the derivation of the temporal merge candidate.

FIG. 4 shows examples of candidate positions for temporal merge candidate, C0 and C1.

2.1.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:
1. Number of HMPV candidates is used for merge list generation is set as (N<=4)? M: (8−N), wherein N indicates number of existing candidates in the merge list and M indicates number of available HMVP candidates in the table.

2. Once the total number of available merge candidates reaches the maximally allowed merge candidates minus 1, the merge candidate list construction process from HMVP is terminated.

2.1.4. Pair-Wise Average Merge Candidates Derivation

Pairwise average candidates are generated by averaging predefined pairs of candidates in the existing merge candidate list, and the predefined pairs are defined as {(0,1), (0,2), (1,2), (0,3), (1,3), (2,3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.2. Triangle Partition for Inter Prediction

In VTM, a triangle partition mode (TPM) is supported for inter prediction. The triangle partition mode is only applied to CUs that are 64 samples or larger and are coded in skip or merge mode but not in a regular merge mode, or MMVD mode, or CIIP mode or subblock merge mode. A CU-level flag is used to indicate whether the triangle partition mode is applied or not.

Figure 5:
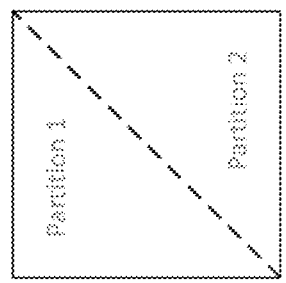
FIG. 5 shows an example of a triangle partition based inter prediction.
Figure 5:
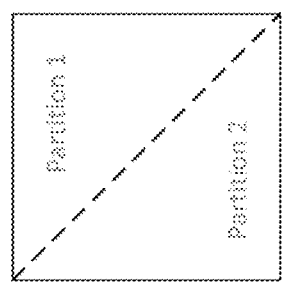

When this mode is used, a CU is split evenly into two triangle-shaped partitions, using either the diagonal split or the anti-diagonal split (FIG. 5). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived directly the merge candidate list constructed for extended merge prediction in 2.1, and the selection of a uni-prediction motion from a given merge candidate in the list is according to the procedure in 2.2.1.

FIG. 5 shows an example of a triangle partition based inter prediction.

If triangle partition mode is used for a current CU, then a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes.

Finally, the motion field of a CU predicted using the triangle partition mode is stored in 4×4 units as in 2.2.3.

2.2.1. Uni-Prediction Candidate List Construction

Figure 6:
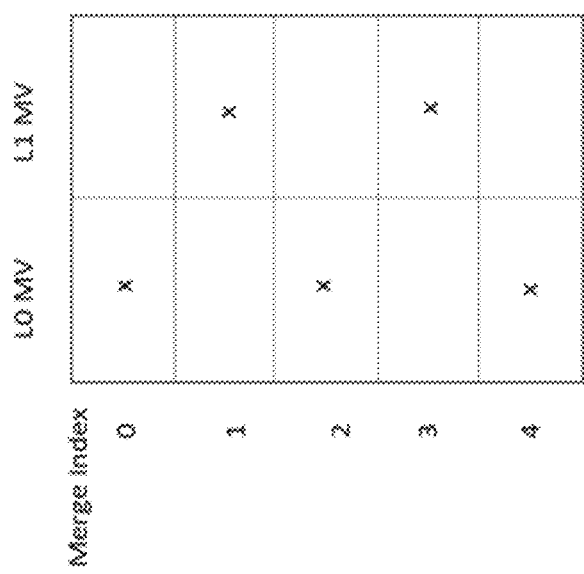
FIG. 6 shows an example of uni-prediction MV selection for triangle partition mode.

Given a merge candidate index, the uni-prediction motion vector is derived from the merge candidate list constructed for extended merge prediction using the process in 2.1, as exemplified in FIG. 6. For a candidate in the list, its LX motion vector with X equal to the parity of the merge candidate index value, is used as the uni-prediction motion vector for triangle partition mode. These motion vectors are marked with "x" in FIG. 6. In case a corresponding LX motion vector does not exist, the L(1−X) motion vector of the same candidate in the extended merge prediction candidate list is used as the uni-prediction motion vector for triangle partition mode.

2.2.2. Blending Along the Triangle Partition Edge

Figure 7:
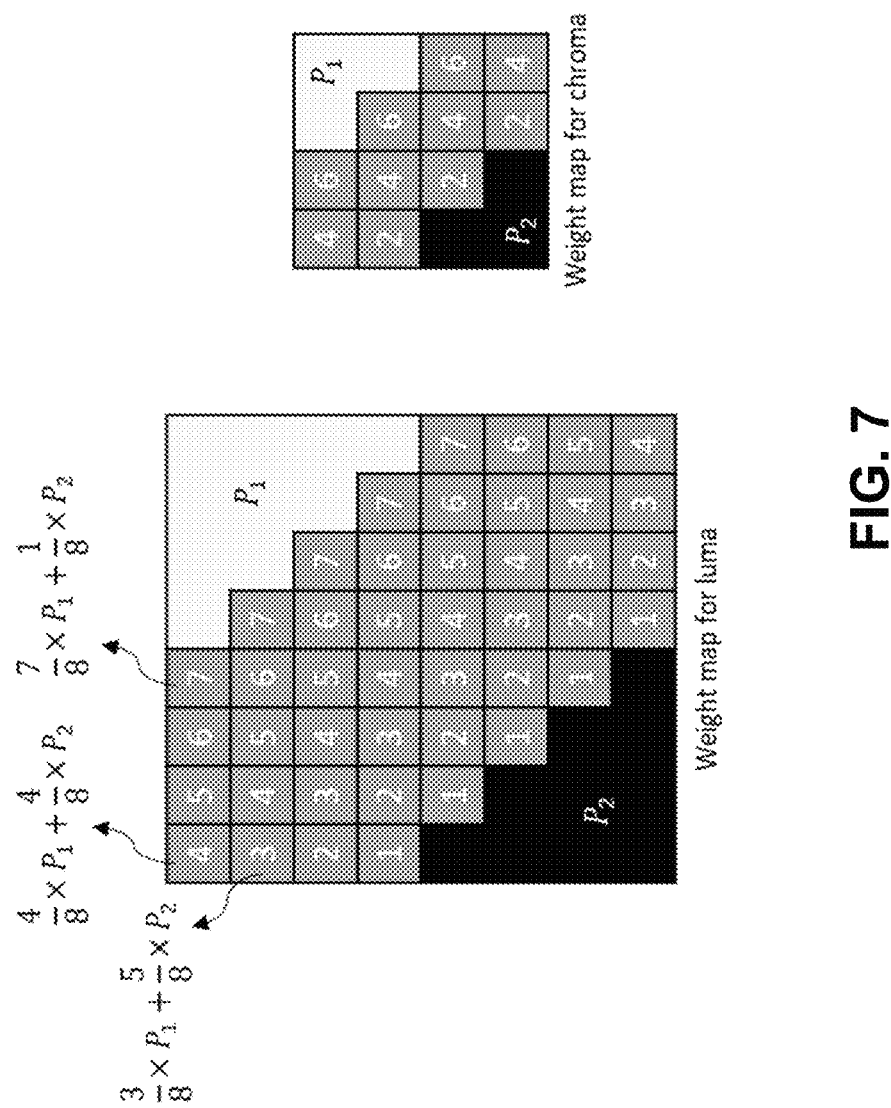
FIG. 7 shows examples of weights used in a blending process.

After predicting each triangle partition using its own motion, blending is applied to the two prediction signals to derive samples around the diagonal or anti-diagonal edge. The following weights are used in the blending process:

{7/8, 6/8, 5/8, 4/8, 3/8, 2/8, 1/8} for luma and {6/8, 4/8, 2/8} for chroma, as shown in FIG. 7.

FIG. 7 shows an example of weights used in the blending process.

2.2.3. Motion Field Storage

The motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. If a 4×4 unit is located in the non-weighted area shown in the example of FIG. 7, either Mv1 or Mv2 is stored for that 4×4 unit. Otherwise, if the 4×4 unit is located in the weighted area, a bi-prediction motion vector is stored. The bi-prediction motion vector is derived from Mv1 and Mv2 according to the following process:

1) If Mv1 and Mv2 are from different reference picture lists (one from L0 and the other from L1), then Mv1 and Mv2 are simply combined to form the bi-prediction motion vector.

2) Otherwise, if Mv1 and Mv2 are from the same list, and without loss of generality, assume they are both from L0. In this case, 2.a) If the reference picture of either Mv2 (or Mv1) appears in L1, then that Mv2 (or Mv1) is converted to a L1 motion vector using that reference picture in L1. Then the two motion vectors are combined to form the bi-prediction motion vector;

Otherwise, instead of bi-prediction motion, only uni-prediction motion Mv1 is stored.

2.3. Specification of Triangle Partition in VVC WD6

The following specification of deblocking filtering process is extracted from the latest VVC working draft JVET-O2001-vE.

2.3.1. Merge Data Syntax

| merge_data( x0, y0, cbWidth, cbHeight, chType ) { | Descriptor |
|---|---|
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1) { | |
|       if( MaxNumSubblockMergeCand > 1 ) | |

| merge_data( x0, y0, cbWidth, cbHeight, chType ) { | Descriptor |
|---|---|
|     merge_subblock_idx[ x0 ][ y0 ] | ae(v) |
|   } else { | |
|     if( ( cbWidth * cbHeight) >= 64 && ( (sps_ciip_enabled_flag && | |
|       cu_skip_flag[ x0 ][ y0 ] = = 0 && cbWidth < 128 && cbHeight < 128) \|\| | |
|       ( sps_triangle_enabled_flag && MaxNumTriangleMergeCand > 1 && | |
|       slice_type = = B ) ) ) | |
|     regular_merge_flag[ x0 ][ y0 ] | ae(v) |
|     if ( regular_merge_flag[ x0 ][ y0 ] = = 1 ) { | |
|       if( sps_mmvd_enabled_flag ) | |
|         mmvd_merge_flag[ x0 ][ y0 ] | ae(v) |
|       if( mmvd_merge_flag[ x0 ][ y0 ] = = 1) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumMergeCand > 1 ) | |
|           merge_idx[ x0 ][ y0 ] | ae(v) |
|       } | |
|     } else { | |
|       ***if(sps_ciip_enabled_flag && sps_triangle_enabled_flag && MaxNumTriangleMergeCand>1 && slice_type = =B && cu_skip_flag[x0][y0]= = 0 && (cbWidth\*cbHeight) >=64 && cbWidth < 128 && cbHeight < 128) {*** | |
|         ciip_flag[ x0 ][ y0 ] | ae(v) |
|       if( ciip_flag[ x0 ][ y0 ] && MaxNumMergeCand > 1 ) | |
|         merge_idx[ x0 ][ y0 ] | ae(v) |
|       if( !ciip_flag[ x0 ][ y0 ] && MaxNumTriangleMergeCand > 1) { | |
|         merge_triangle_split_dir[ x0 ][ y0 ] | ae(v) |
|         merge_triangle_idx0[ x0 ][ y0 ] | ae(v) |
|         merge_triangle_idx1[ x0 ][ y0 ] | ae(v) |
|       } | |
|     } | |
|   } | |
| } | |

2.3.2. Merge Data Semantics ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred as follows:

If all the following conditions are true, ciip_flag[x0][y0] is inferred to be equal to 1:
    sps_ciip_enabled_flag is equal to 1.
    general_merge_flag[x0][y0] is equal to 1.
    merge_subblock_flag[x0][y0] is equal to 0.
    regular_merge_flag[x0][y0] is equal to 0.
    cbWidth is less than 128.
    cbHeight is less than 128.
    cbWidth*cbHeight is greater than or equal to 64.
  Otherwise, ciip_flag[x0][y0] is inferred to be equal to 0.

When ciip_flag[x0][y0] is equal to 1, the variable IntraPredModeY[x][y] with x=x0 . . . x0+cbWidth−1 and y=y0 . . . y0+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
    sps_triangle_enabled_flag is equal to 1.
    slice_type is equal to B.
    general_merge_flag[x0][y0] is equal to 1.
    MaxNumTriangleMergeCand is greater than or equal to 2.
    cbWidth*cbHeight is greater than or equal to 64.
    regular_merge_flag[x0][y0] is equal to 0.
    merge_subblock_flag[x0][y0] is equal to 0.
    ciip_flag[x0][y0] is equal to 0.
  Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0. merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0. merge_triangle_idx1 [x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.

2.3.3. Derivation Process for Triangle Motion Vector Components and Reference Indices

2.3.3.1. General

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvA and mvB,
- the chroma motion vectors in 1/32 fractional-sample accuracy mvCA and mvCB,
- the reference indices refIdxA and refIdxB,
- the prediction list flags predListFlagA and predListFlagB.

The derivation process for luma motion vectors for triangle merge mode as specified in clause 2.3.3.2 is invoked with the luma location (xCb, yCb), the variables cbWidth and cbHeight as inputs, and the output being the luma motion vectors mvA, mvB, the reference indices refIdxA, refIdxB and the prediction list flags predListFlagA and predListFlagB.

The derivation process for chroma motion vectors in clause 2.3.3.3 is invoked with mvA and refIdxA as input, and the output being mvCA.

The derivation process for chroma motion vectors in clause 2.3.33 is invoked with mvB and refIdxB as input, and the output being mvCB.

2.3.3.2. Derivation process for luma motion vectors for merge triangle mode This process is only invoked when MergeTriangleFlag[xCb][yCb] is equal to 1, where (xCb, yCb) specify the top-left sample of the current luma coding block relative to the top-left luma sample of the current picture.

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvA and mvB,
- the reference indices refIdxA and refIdxB,
- the prediction list flags predListFlagA and predListFlagB.

The motion vectors mvA and mvB, the reference indices refIdxA and refIdxB and the prediction list flags predListFlagA and predListFlagB are derived by the following ordered steps:

The derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the bi-prediction weight index bcwIdx and the merging candidate list mergeCandList.

The variables m and n, being the merge index for triangle partition 0 and 1 respectively, are derived using merge_triangle_idx0[xCb][yCb] and merge_triangle_idx1[xCb][yCb] as follows:

$$m = \text{merge\_triangle\_}idx0[xCb][yCb] \quad (8\text{-}475)$$

$$n = \text{merge\_triangle\_}idx1[xCb][yCb] + (\text{merge\_triangle\_}idx1[xCb][yCb] >= m)?1:0 \quad (8\text{-}476)$$

Let refIdxL0M and refIdxL1M, predFlagL0M and predFlagL1M, and mvL0M and mvL1M be the reference indices, the prediction list utilization flags and the motion vectors of the merging candidate M at position m in the merging candidate list mergeCandList (M=mergeCandList[m]).

The variable X is set equal to (m & 0x01).
When predFlagLXM is equal to 0, X is set equal to (1−X).
The following applies:

$$mvA[0] = mvLXM[0] \quad (8\text{-}477)$$

$$mvA[1] = mvLXM[1] \quad (8\text{-}478)$$

$$refIdxA = refIdxLXM \quad (8\text{-}479)$$

$$predListFlagA = X \quad (8\text{-}480)$$

Let refIdxL0N and refIdxL1N, predFlagL0N and predFlagL1N, and mvL0N and mvL1N be the reference indices, the prediction list utilization flags and the motion vectors of the merging candidate N at position m in the merging candidate list mergeCandList (N=mergeCandList[n]).

The variable X is set equal to (n & 0x01).
When predFlagLXN is equal to 0, X is set equal to (1−X).
The following applies:

$$mvB[0] = mvLXN[0] \quad (8\text{-}481)$$

$$mvB[1] = mvLXN[1] \quad (8\text{-}482)$$

$$refIdxB = refIdxLXN \quad (8\text{-}483)$$

$$predListFlagB = X \quad (8\text{-}484)$$

2.3.3.3. Derivation Process for Chroma Motion Vectors

Input to this process are:
- a luma motion vector in 1/16 fractional-sample accuracy mvLX,
- the reference index refIdxLX.

Output of this process is a chroma motion vector in 1/32 fractional-sample accuracy mvCLX.

A chroma motion vector is derived from the corresponding luma motion vector.
The chroma motion vector mvCLX, is derived as follows:

$$mvCLX[0] = mvLX[0]*2/\text{SubWidth}C \quad (8\text{-}435)$$

$$mvCLX[1] = mvLX[1]*2/\text{SubHeight}C \quad (8\text{-}436)$$

2.3.4. Decoding Process for Triangle Inter Blocks

2.3.4.1. General

This process is invoked when decoding a coding unit with MergeTriangleFlag[xCb][yCb] equal to 1.

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples, the luma motion vectors in 1/16 fractional-sample accuracy mvA and mvB, the chroma motion vectors mvCA and mvCB, the reference indices refIdxA and refIdxB, the prediction list flags predListFlagA and predListFlagB.

Outputs of this process are:

an (cbWidth)×(cbHeight) array $predSamples_L$ of luma prediction samples, an (cbWidth/SubWidthC)×(cbHeight/SubHeightC) array $predSamples_{Cb}$ of chroma prediction samples for the component Cb, an (cbWidth/SubWidthC)×(cbHeight/SubHeightC) array $predSamples_{Cr}$ of chroma prediction samples for the component Cr.

Let $predSamplesLA_L$ and $predSamplesLB_L$ be (cbWidth)×(cbHeight) arrays of predicted luma sample values and, $predSamplesLA_{Cb}$, $predSamplesLB_{Cb}$, $predSamplesLA_{Cr}$ and $predSamplesLB_{Cr}$ be (cbWidth/SubWidthC)×(cbHeight/SubHeightC) arrays of predicted chroma sample values.

The $predSamples_L$, $predSamples_{Cb}$ and $predSamples_{Cr}$ are derived by the following ordered steps:

1. For N being each of A and B, the following applies:

The reference picture consisting of an ordered two-dimensional array $refPicLN_L$ of luma samples and two ordered two-dimensional arrays $refPicLN_{Cb}$ and $refPicLN_{Cr}$ of chroma samples is derived by invoking the process specified in clause 8.5.6.2 in VVC WD6 with X set equal to predListFlagN and refIdxX set equal to refIdxN as input.

The array $predSamplesLN_L$ is derived by invoking the fractional sample interpolation process specified in clause 8.5.6.3 in VVC WD6 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array $refPicLX_L$ set equal to $refPicLN_L$, the variable bdofFlag set equal to FALSE, and the variable cIdx is set equal to 0 as inputs.

The array $predSamplesLN_{Cb}$ is derived by invoking the fractional sample interpolation process specified in clause 8.5.6.3 in VVC WD6 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array $refPicLX_{Cb}$ set equal to $refPicLN_{Cb}$, the variable bdofFlag set equal to FALSE, and the variable cIdx is set equal to 1 as inputs.

The array $predSamplesLN_{Cr}$ is derived by invoking the fractional sample interpolation process specified in clause 8.5.6.3 in VVC WD6 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array $refPicLX_{Cr}$ set equal to $refPicLN_{Cb}$, the variable bdofFlag set equal to FALSE, and the variable cIdx is set equal to 2 as inputs.

2. The partition direction of merge triangle mode variable triangleDir is set equal to merge_triangle_split_dir [xCb][yCb].

3. The prediction samples inside the current luma coding block, $predSamples_L[x_L][y_L]$ with $x_L=0 \ldots$ cbWidth−1 and $y_L=0 \ldots$ cbHeight−1, are derived by invoking the weighted sample prediction process for triangle merge mode specified in clause 2.3.4.2 with the coding block width nCbW set equal to cbWidth, the coding block height nCbH set equal to cbHeight, the sample arrays $predSamplesLA_L$ and $predSamplesLB_L$, and the variables triangleDir, and cIdx equal to 0 as inputs.

4. The prediction samples inside the current chroma component Cb coding block, $predSamples_{Cb}[x_C][y_C]$ with $x_C=0 \ldots$ cbWidth/SubWidthC−1 and $y_C=0 \ldots$ cbHeight/SubHeightC−1, are derived by invoking the weighted sample prediction process for triangle merge mode specified in clause 2.3.4.2 with the coding block width nCbW set equal to cbWidth/SubWidthC, the coding block height nCbH set equal to cbHeight/SubHeightC, the sample arrays $predSamplesLA_{Cb}$ and $predSamplesLB_{Cb}$, and the variables triangleDir, and cIdx equal to 1 as inputs.

5. The prediction samples inside the current chroma component Cr coding block, $predSamples_{Cr}[x_C][y_C]$ with $x_C=0 \ldots$ cbWidth/SubWidthC−1 and $y_C=0 \ldots$ cbHeight/SubHeightC−1, are derived by invoking the weighted sample prediction process for triangle merge mode specified in clause 2.3.4.2 with the coding block width nCbW set equal to cbWidth/SubWidthC, the coding block height nCbH set equal to cbHeight/SubHeightC, the sample arrays $predSamplesLA_{Cr}$ and $predSamplesLB_{Cr}$, and the variables triangleDir, and cIdx equal to 2 as inputs.

6. The motion vector storing process for merge triangle mode specified in clause 2.3.4.3 is invoked with the luma coding block location (xCb, yCb), the luma coding block width cbWidth, the luma coding block height cbHeight, the partition direction triangleDir, the luma motion vectors mvA and mvB, the reference indices refIdxA and refIdxB, and the prediction list flags predListFlagA and predListFlagB as inputs.

2.3.4.2. Weighted Sample Prediction Process for Triangle Merge Mode

Inputs to this process are:

two variables nCbW and nCbH specifying the width and the height of the current coding block, two (nCbW)×(nCbH) arrays predSamplesLA and predSamplesLB, a variable triangleDir specifying the partition direction, a variable cIdx specifying colour component index.

Output of this process is the (nCbW)×(nCbH) array pbSamples of prediction sample values.

The variable nCbR is derived as follows:

$$nCbR=(nCbW>nCbH)?(nCbW/nCbH):(nCbH/nCbW) \qquad (8\text{-}841)$$

The variable bitDepth is derived as follows:

If cIdx is equal to 0, bitDepth is set equal to $BitDepth_Y$.

Otherwise, bitDepth is set equal to $BitDepth_C$.

Variables shift1 and offset1 are derived as follows:

The variable shift1 is set equal to Max(5, 17−bitDepth).

The variable offset1 is set equal to 1<<(shift1−1).

Depending on the values of triangleDir, wS and cIdx, the prediction samples pbSamples[x][y] with x=0 . . . nCbW−1 and y=0 . . . nCbH−1 are derived as follows:

The variable wIdx is derived as follows:

If cIdx is equal to 0 and triangleDir is equal to 0, the following applies:

$$wIdx=(nCbW>nCbH)?(Clip3(0,8,(x/nCbR-y)+4)): \\ (Clip3(0,8,(x-y/nCbR)+4)) \qquad (8\text{-}842)$$

Otherwise, if cIdx is equal to 0 and triangleDir is equal to 1, the following applies:

wIdx=(nCbW>nCbH)?(Clip3(0,8,(nCbH−1−x/nCbR−y)+4))(Clip3(0,8,(nCbW−1−x−y/nCbR)+4))  (8-843)

Otherwise, if cIdx is greater than 0 and triangleDir is equal to 0, the following applies:

wIdx=(nCbW>nCbH)?(Clip3(0,4,(x/nCbR−y)+2)):(Clip3(0,4,(x−y/nCbR)+2))  (8-844)

Otherwise (if cIdx is greater than 0 and triangleDir is equal to 1), the following applies:

wIdx=(nCbW>nCbH)?(Clip3(0,4,(nCbH−1−x/nCbR−y)+2))(Clip3(0,4,(nCbW−1−x−y/nCbR)+2))  (8-845)

The variable wValue specifying the weight of the prediction sample is derived using wIdx and cIdx as follows:

wValue=(cIdx==0)?Clip3(0,8,wIdx): Clip3(0,8, wIdx*2)  (8-846)

The prediction sample values are derived as follows:

pbSamples[x][y]=Clip3(0,(1<<bitDepth)−1,(predSamplesLA[x][y]*wValue+predSamplesLB[x][y]*(8−wValue)+offset1)>>shift1)  (8-847)

2.3.4.3. Motion Vector Storing Process for Triangle Merge Mode

This process is invoked when decoding a coding unit with MergeTriangleFlag[xCb][yCb] equal to 1.

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- a variable triangleDir specifying the partition direction,
- the luma motion vectors in 1/16 fractional-sample accuracy mvA and mvB,
- the reference indices refIdxA and refIdxB,
- the prediction list flags predListFlagA and predListFlagB.

The variables numSbX and numSbY specifying the number of 4×4 blocks in the current coding block in horizontal and vertical direction are set equal to numSbX=cbWidth>>2 and numSbY=cbHeight>>2.

The variable minSb is set equal to Min(numSbX, numSbY)−1.

The variable cbRatio is derived as follows:

cbRatio=(cbWidth>cbHeight)?(cbWidth/cbHeight):(cbHeight/cbWidth)  (8-848)

For each 4×4 subblock at subblock index (xSbIdx, ySbIdx) with xSbIdx=0 . . . numSbX−1, and ySbIdx=0 . . . numSbY−1, the following applies:

The variables xIdx and yIdx are derived as follows:

xIdx=(cbWidth>cbHeight)?(xSbIdx/cbRatio):xSbIdx  (8-849)

yIdx=(cbWidth>cbHeight)?ySbIdx:(ySbIdx/cbRatio)  (8-850)

The variable sType is derived as follows:
If triangleDir is equal to 0, the following applies:

sType=(xIdx==yIdx)?2:((xIdx>yIdx)?0:1)  (8-851)

Otherwise (triangleDir is equal to 1), the following applies:

sType=(xIdx+yIdx==min Sb)?2:((xIdx+yIdx<min Sb)?0:1)  (8-852)

Depending on the value of sType, the following assignments are made:
If sType is equal to 0, the following applies:

predFlagL0=(predListFlagA==0)?1:0  (8-853)

predFlagL1=(predListFlagA==0)?0:1  (8-854)

refIdxL0=(predListFlagA==0)?refIdxA:−1  (8-855)

refIdxL1=(predListFlagA==0)?−1:refIdxA  (8-856)

mvL0[0]=(predListFlagA==0)?mvA[0]:0  (8-857)

mvL0[1]=(predListFlagA==0)?mvA[1]:0  (8-858)

mvL1[0]=(predListFlagA==0)?0:mvA[0]  (8-859)

mvL1[1]=(predListFlagA==0)?0:mvA[1]  (8-860)

Otherwise, if sType is equal to 1 or (sType is equal to 2 and predListFlagA+predListFlagB is not equal to 1), the following applies:

predFlagL0=(predListFlagB==0)?1:0  (8-861)

predFlagL1=(predListFlagB==0)?0:1  (8-862)

refIdxL0=(predListFlagB==0)?refIdxB:−1  (8-863)

refIdxL1=(predListFlagB==0)?−1:refIdxB  (8-864)

mvL0[0]=(predListFlagB==0)?mvB[0]:0  (8-865)

mvL0[1]=(predListFlagB==0)?mvB[1]:0  (8-866)

mvL1[0]=(predListFlagB==0)?0:mvB[0]  (8-867)

mvL1[1]=(predListFlagB==0)?0:mvB[1]  (8-868)

Otherwise (sType is equal to 2 and predListFlagA+predListFlagB is equal to 1), the following applies:

predFlagL0=1  (8-869)

predFlagL1=1  (8-870)

refIdxL0=(predListFlagA==0)?refIdxA:refIdxB  (8-871)

refIdxL1=(predListFlagA==0)?refIdxB:refIdxA  (8-872)

mvL0[0]=(predListFlagA==0)?mvA[0]:mvB[0]  (8-873)

mvL0[1]=(predListFlagA==0)?mvA[1]:mvB[1]  (8-874)

mvL1[0]=(predListFlagA==0)?mvB[0]:mvA[0]  (8-875)

mvL1[1]=(predListFlagA==0)?mvB[1]:mvA[1]  (8-876)

The following assignments are made for x=0 . . . 3 and y=0 . . . 3:

MvL0[(xSbIdx<<2)+x][(ySbIdx<<2)+y]=mvL0  (8-877)

MvL1[(xSbIdx<<2)+x][(ySbIdx<<2)+y]=mvL1  (8-878)

RefIdxL0[(xSbIdx<<2)+x][(ySbIdx<<2)+y]=refIdxL0  (8-879)

RedIdxL1[(xSbIdx<<2)+x][(ySbIdx<<2)+y]=refIdxL1  (8-880)

PredFlagL0[(xSbIdx<<2)+x][(ySbIdx<<2)+y]=predFlagL0  (8-881)

PredFlagL1[(xSbIdx<<2)+x][(ySbIdx<<2)+y]=predFlagL1  (8-882)

2.4. Geometric Merge Mode (GEO)

In JVET-P0068, GEO merge mode is being studied as an extension of the existing TPM in VVC. GEO uses the same prediction blending concept as TPM but extends the blending masks up to 140 different modes with 32 angles and 5 distance offsets. The blending masks of GEO modes are derived from the distance of the sample position and the split boundary using three look-up tables. In this mode, blocks are partitioned using an angular partition such that at least one partition has a non-horizontal and non-vertical border.

2.4.1. Concept Description

Figure 13A:
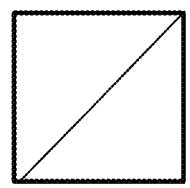
FIG. 13A shows an example of TPM design in VTM6.0.
Figure 13A:
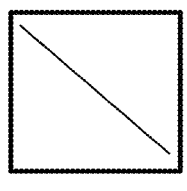
Figure 13B:
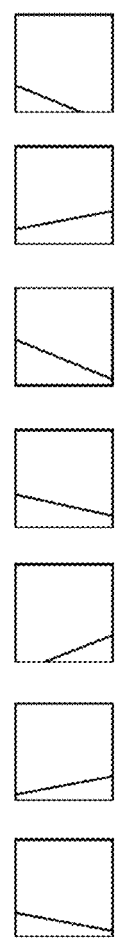
FIG. 13B shows an example of proposal of TPM design.

FIGS. 13A and 13B illustrate TPM in VTM-6.0 and additional shapes proposed for non-rectangular inter blocks.

Similarly to TPM proposed GEO partitioning for inter is allowed for uni-predicted blocks not smaller than 8×8 in order to have the same memory bandwidth with bi-predicted blocks at decoder side. Motion vector prediction for GEO partitioning is aligned with TPM. As well as in TPM blending between 2 predictions is applied on inner boundary.

Figure 14:
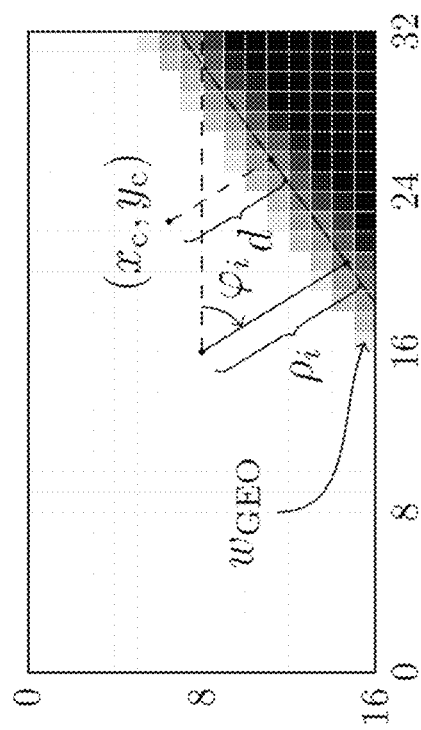
FIG. 14 shows an example of GEO split boundary description.

The split boundary of geometric merge mode is descripted by angle $\varphi_i$ and distance offset $\rho_i$ as shown in FIG. 14. Angle $\varphi_i$ represents a quantized angle between 0 and 360 degrees and distance offset $\rho_i$ represents a quantized offset of the largest distance $\rho_{max}$. In addition, the split directions overlapped with binary tree splits and TPM splits are excluded.

2.4.2. Angle and Distance Quantization.

Angles $\varphi_i$ is quantized between 0 and 360 degrees with a fix step.

Figure 15B:
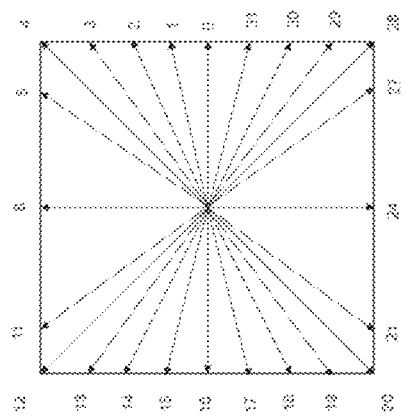
FIG. 15B shows an example for 24 angles scheme of angles quantization of geometric merge mode.
Figure 15A:
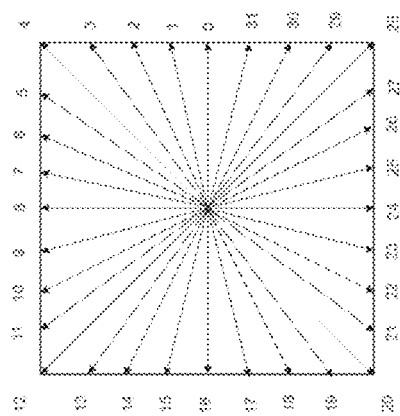
FIG. 15A shows an example for 32 angles scheme of angles quantization of geometric merge mode.

In CE4-1.1, CE4-1.2a with 108 modes and CE4-1.14, the angle $\varphi_i$ is quantized from between 0 and 360 degrees with step 11.25 degree, in total 32 angles as shown in FIG. 15a In CE4-1.2b with 80 modes, the angle $\varphi_i$ is still quantized with 11.25 degrees steps, however the near vertical direction angles (near horizontal split boundaries) are removed since in the nature values, objectives and motions are mostly horizontal. FIG. 15b illustrated the reduced to 24 angles schemes.

Distance $\rho_i$ is quantized from the largest possible distance $\rho_{max}$ with a fixed step. The value of $\rho_{max}$ can be geometrically derived by Eq. (1) for either w or h is equal to 8 and scaled with log 2 scaled short edge length. For $\varphi$ is equal to 0 degree case, $\rho_{max}$ is equal to w/2 and for $\varphi$ is equal to 90 degree case, $\rho_{max}$ is equal to h/2 and. The shifted back "1.0" samples is to avoid that the split boundary is too close to the corner.

$$\rho_{max}(\varphi, w, h) = \cos(\varphi)\left(\frac{h}{2\tan\left(\frac{\pi}{2} - \varphi\right)} + \frac{w}{2}\right) - 1.0, \ 0 < \varphi < \frac{\pi}{2} \quad (1)$$

In CE4-1.1 and CE4-1.14, the distance $\rho_i$ is quantized with 5 steps, considering 32 angles there is in total 140 split modes excludes the binary tree and TPM splits In CE4-1.2a with 108 modes, the distance $\rho_i$ is quantized with 4 steps, considering 32 angles there is in total 108 split modes excludes the binary tree and TPM splits In CE4-1.2b with 80 modes, the distance $\rho_i$ is quantized with 4 steps, considering 24 angles there is in total 80 split modes excludes the binary tree and TPM splits.

The number of angles, distances and modes for CE tests are summarized in Table 1:

TABLE 1

| number of angles, number of distances, number of split modes | | | |
|---|---|---|---|
| | CE4-1.1 | CE4-1.2a | CE4-1.2b |
| Number of angles | 32 | 32 | 24 |
| Number of distance | 5 | 4 | 4 |
| Number of split modes | 140 | 108 | 80 |

2.4.3. Blending Operation for Luma Blocks

Same as TPM mode, in geometric merge mode, the final predictor $P_B$ with the 3 bits blending mask $W_0$ and $W_1$ as in Eq. (2)

$$P_B = (W_0 P_0 + W_1 P_1 + 4) >> 3 \quad (2)$$

The blending masks of geometric merge mode are derived from the distance of the sample position and the split boundary using look-up tables with Eq. (3), (4) and (5)

$$\text{distFromLine} = ((x<<1)+1)*\text{Dis}[\text{displacement}X] + ((y<<1)+1))*\text{Dis}[\text{displacement}Y] - \text{rho} \quad (3)$$

$$\text{distScaled} = \text{Clip3}(0, 26, (\text{abs}(\text{distFromLine})+4)>>3) \quad (4)$$

$$\text{sampleWeight}L[x][y] = \text{distFromLine} <= 0 ? \text{GeoFilter}[\text{distScaled}] : 8 - \text{GeoFilter}[\text{distScaled}] \quad (5)$$

Where 3 look-up tables, Dis[.] with 32 entries, StepDis[.] with 36 entries and GeoFilter[.] with 26 entries are involved.

The bottom-left sample of current block is guaranteed to be predicted from $P_0$. In other words, when the distFromLine of the bottom-left sample is negative, $W_0$ is equal to sampleWeightL[x][y] and $W_1$ is equal to 8-$W_0$. Otherwise (the distFromLine of the bottom-left sample is positive), $W_1$ is equal to sampleWeightL[x][y] and $W_0$ is equal to 8-$W_1$ The real computational complexity of geometric blending mask derivation is from Eq. (3), since all rest operations are using look-up table.

In VTM software implementation, the Eq. (3) requires 1 addition per sample and 1 addition per sample row, for example in an 8×8 CU, 1.125 additions and 0.015625 multiplications are required per sample;

In order to parallel processing each 4×4 Units, for example in an 8×8 CU, 1.25 additions and 0.0625 multiplications are required per sample;

In order to parallel processing each line (8×8 CU for example), 1 additions and 0.125 multiplications are required per sample;

In order to parallel processing all samples in a CU, for each samples 2 multiplications and 1 additions are required.

The worst case (8×8) per sample computation complexity is summarized in table 2:

TABLE 2

| worst case complexity analysing | | | | |
|---|---|---|---|---|
| Operations (per pixel) | Non-Parallel Processing | 4 × 4 subblock based parallel | Line based parallel | Sample based parallel |
| Mults | 0.015625 | 0.0625 | 0.125 | 2 |
| Adds | 1.125 | 1.25 | 1 | 1 |
| Shifts | 3 | 3 | 3 | 3 |

For more details regarding the blending operation, please refer to the accompanying draft specification modifications document, section "8.5.7.3 Weighted sample prediction process for geometric merge mode"

2.4.4. Blending Operation for Chroma Blocks

The sample weights calculated for the luma samples are subsampled and are used for chroma blending without any computation. The chroma sample weight at coordinate (x,y) is set equal to luma sample weight at coordinate (2x,2y) w.r.t. the top-left sample of luma block.

2.4.5. Motion Vector Derivation

Same merge list derivation process that is used for TPM is used for deriving motion vectors of each partition of the GEO block. Each partition is predicted only by uni-prediction.

2.4.6. Motion Vector Storage

In CE4-1.1 and CE4-1.2, luma sample weights at the four corners of a 4×4 motion storage unit is summed up. Then the sum is compared with 2 thresholds to decide whether one of two uni-prediction motion information or bi-prediction motion information is stored. The bi-prediction motion information is derived using the same process as TPM.

In CE4-1.14, the motion vector storage process is further simplified. The distance between the central position of a 4×4 motion storage unit and the split boundary is calculated and compared with a fixed threshold to decide whether uni- or bi prediction motion information is storage for this 4×4 motion storage unit. The sign of the distance is indicate which uni-prediction motion information should be stored in uni-prediction storage case. In CE4-1.14 the dependency of blending mask and motion storage are removed.

2.4.7. Mode Signalling

According to the proposed method the GEO mode is signalled as an additional merge mode together with TPM mode.

TABLE 3

Syntax elements introduced by the proposal

```
if( !ciip_flag[ x0 ][ y0 ] && MaxNumTriangleMergeCand > 1 ) {
    if (cbWidth > = 8 && cbHeight >= 8 )
        merge_geo_flag[ x0 ][ y0 ]                        ae(v)
    if ( merge_geo_flag[ x0 ][ y0 ] )
        merge_geo_idx[ x0 ][ y0 ]                         ae(v)
    else
        merge_triangle_split_dir[ x0 ][ y0 ]              ae(v)
        merge_triangle_idx0[ x0 ][ y0 ]                   ae(v)
        merge_triangle_idx1[ x0 ][ y0 ]                   ae(v)
}
```

The merge_geo_flag[ ][ ] is signaled with 4 CABAC context models, first 3 are derived depending on the mode of above and left neighouring blocks, the 4$^{th}$ is derived depending the aspect ratio of the current block. merge_geo_flag[ ][ ] is indicate whether current block is using GEO mode or TPM mode, which is similar as a "most probable mode" flag.

The geo_partition_idx[ ][ ] is used as an index to the lookup table that stores the angle $\varphi_i$ and distance $\rho_i$ pairs. The geo_partition_idx coded truncated binary and binarized using bypass.

3. Examples of Technical Problems Solved by the Technical Solutions Described Herein There are several problems in the latest VVC working draft WD6 (JVET-O2001-v14), which are described below.

Figure 8:
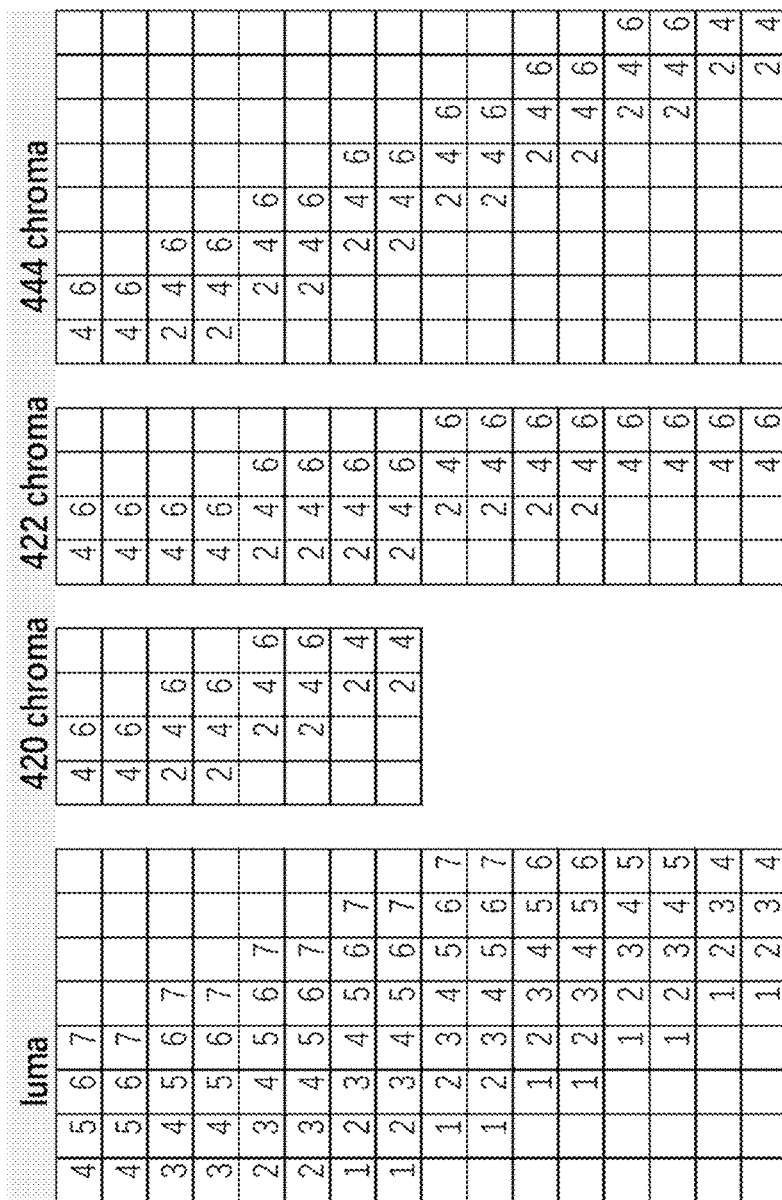
FIG. 8 shows an example of weights used in the blending process for an 8×16 TPM block (WD6).

(1) In WD6, for the blending process of two triangle partitions, the chroma weights does not align with luma weights, as shown in FIG. 8, which may cause visual artifact.

(2) In WD6, the settings of weights for triangle prediction didn't consider multiple chroma formats such as 4:2:2 and 4:4:4, as shown in FIG. 8.

(3) In WD6, only even weights are allowed for chroma, which is not consistent with luma as both even and odd integers are allowed for luma components, as shown in FIG. 8.

(4) In WD6, TPM is allowed for 4×N and N×4 blocks, in which all pixels are required to perform weighted blending, which may be not desirable.

(5) In WD6, TPM is allowed for blocks with width and height ratio greater than 2, which may be not desirable.

(6) The GEO and TPM are separately applied with independent signaling and independent calculation of blending weight masks and motion storage masks.

FIG. 8 shows an example of weights used in the blending process for an 8×16 TPM block (WD6).

4. Examples of Embodiments and Techniques

The items listed below should be considered as examples to explain general concepts. These items should not be interpreted in a narrow way. Furthermore, these items can be combined in any manner.

The term 'TPM' may represent a coding method that split one block into two or more sub-regions, and transform is applied to the whole block. The term 'TPM' may indicate the triangle prediction mode and/or the geometric merge mode which is an extension of triangle prediction mode.

Weighted Samples in the TPM Blending Process

1. The weights of TPM chroma prediction samples may align with the weights of collocated luma prediction samples.
   a) In one example, weights for TPM coded chroma blocks (e.g., Cb block and/or Cr block) may be set according to the weights of collocated luma block.
   b) In one example, weights for a TPM coded chroma block maybe a subset of the weights of collocated luma block.
   c) In one example, a chroma block with dimensions M×N may be assigned with the same weight as a luma block with dimensions M×N for each position inside the block.
2. The weights of TPM chroma prediction samples may be dependent on the collocated luma block width and height, and/or color formats, including the chroma subsampling ratio.
   a) In one example, for 4:4:4 chroma format, the weight of a TPM chroma prediction sample may be same as the weight of collocated luma prediction sample for each position inside the block.
   b) In one example, for 4:2:0 and 4:2:2 chroma formats, the weights of TPM chroma prediction samples may be subsampled from the weights of TPM luma prediction samples.
      i. For a W×H TPM prediction block, with W as the block width and H as the block height, subWidthC and subHeightC denote the chroma subsampling ratio in width and height directions, respectively. Suppose the weights of luma prediction block is denoted by a two-dimensional array WeightY[x][y], with x=0 . . . (W−1), y=0 . . . (H−1), then the weights for the collocated chroma prediction block, WeightC [x][y], with x=0 . . . (W/subWidthC−1), y=0 . . . (H/subHeightC−1), may be calculated by WeightY [f(x)][g(y)].

1) In on example, f(x)=x*subWidthC+offsetX, g(y)= y*subHeightC+OffsetY, e.g. OffsetX=OffsetY= 0.
   ii. Suppose the weight for a position (x, y) in a W×H TPM luma block are calculated by w(x,y), e.g. w(x,y)=a*x+b*y+c, where x=0 . . . W−1 and y=0 . . . H−1 are coordinates of luma samples, and a, b, c are integers depending on W and/or H. In one example, the weight for a position (x', y') in the collocated TPM chroma block may be calculated as w(f(x'), g(y')), e.g. w(f(x'), g(y'))=a*(subWidthC*x')+b*(subHeightC*y')+c, where x'=0 . . . W/subWidthC−1 and y'=0 . . . H/subHeightC−1 are coordinates of chroma samples.
   c) In one example, the weights used in TPM may only depend on the dimensions (width or/and height) of the block and may be the same for different color components.
      i. For example, chroma component with sizeW*H may use the same weights as luma component with sizeW*H.
      ii. In one example, when the weight is not defined for a luma block size, TPM may be disabled for the chroma block of such size.
   d) In one example, the weights used in TPM may depend on both the dimensions (width or/and height) of the block and the color component of the block.
      i. In one example, the weights may be different for different color components.
      ii. In one example, the weights may be same for the two chroma components.
         1) Alternatively, furthermore, the weights used for luma component and chroma component may be different.
3. The weights of TPM prediction samples may be equal to an integer number X.
   a) In one example, either an odd integer number or an even integer number may be assigned as the weight X (such as X=0 . . . 8) of a TPM chroma prediction sample.
   b) The weight for a TPM luma/chroma prediction sample may be clipped to a range [M, N], such as M=0, N=8.
   c) In one example, a TPM weight may be lower than zero.
4. In one example, the blending weight mask of TPM/GEO block may be pre-defined as N tables (such as N>0).
5. In one example, the blending weight mask of TPM/GEO block may be calculated from computing equations.

General Issues of TPM

Denote the block width as W and the block height as H.
6. Whether to enable or disable TPM may depend on the ratios of block width and height e.g., max(H,W)/min(H, W).
   a) Alternatively, whether to enable or disable TPM may depend on the differences between block width and height, e.g., Abs(Log 2(cbWidth)−Log 2(cbHeight)) wherein Abs(x) returns the absolute value of x and Log 2(x) returns the log base 2 of a number x.
   b) TPM may be not allowed for blocks with width to height ratio or height to width ratio greater than X (e.g., X=2).
      i. In one example, for a W×H prediction block, TPM may be disabled if W/H>2.
      ii. In one example, for a W×H prediction block, TPM may be disabled if H/W>2.
7. Whether TPM is allowed or not may be dependent on the maximum transform size.
   a) In one example, TPM may be not allowed for a block with width or/and height larger than the maximum transform size.
8. Whether TPM is allowed or not may be dependent on the maximum CU size.
   a) In one example, TPM may be not allowed for a block with block width or/and height equal to the maximum CU size
9. TPM may be not allowed for blocks with block width larger than N or/and block height larger than M.
   a) In one example, N=M=64.
10. TPM may be not allowed for blocks with block width equal to N or/and block height equal to M.
    a) In one example, N=M=4.
11. TPM may be not allowed for a certain chroma formats.
    a) In one example, TPM may be not allowed for 4:0:0 chroma format.
    b) In one example, TPM may be not allowed for 4:4:4 chroma format.
    c) In one example, TPM may be not allowed for 4:2:2 chroma format.
12. TPM may be not allowed if the resolution of two reference pictures used in TPM are different.
    a) Alternatively, TPM may be not allowed if the resolution of one reference pictures used in TPM is different to the resolution of the current picture.
13. When TPM is disabled or not allowed, the TPM syntax elements (such as merge_triangle_split_dir, merge_triangle_idx0, and merge_triangle_idx1) may be not signaled.
    a) When a syntax element is not signaled, it may be inferred to be 0.
    b) When TPM is disabled or not allowed, the TPM related semantic variables (such as MergeTriangleFlag) may be inferred to be 0.
14. The above bullets may be applied to triangle prediction mode (TPM) and/or the geometric merge mode (GEO). In other words, TPM may refer to GEO.

Unification of TPM and GEO

15. The TPM and GEO may be unified.
    a) In one example, TPM may be treated as a subset of GEO.
       i. Alternatively, GEO may be treated as a subset of TPM.
       ii. For example, if a coding tool A (or equivalently a "mode A", or shortly "A") (such as TPM) is treated as a subset of coding tool B (or equivalently a "mode B", or shortly "B") (such as GEO), then methods disclosed below may be applied.
          1) A and B may be signaled as one mode.
             a) In one example, mode A and mode B may share the same control flag(s) at SPS/VPS/APS/PPS/Slice/Sub-Picture/Tile/Brick/VPDU/CTU/TU/CU/PU/Picture Header/Slice Header level.
             b) In one example, mode A may be signaled as a subset of B.
                i. For example, B is defined as a prediction mode which contains N (such as N>1) sub-modes denoted as $\{M_0, M_1, M_2 \ldots, M_{N-1}\}$, and A may be defined as a prediction mode which contains X sub-modes (such as X<N) denoted as $\{M_0, M_{k0}, M_{k1} \ldots, M_{kX-1}\}$, where $\{M_0, M_{k0}, M_{k1} \ldots, M_{kX-1}\}$ is a subset of $\{M_0, M_1, M_2 \ldots, M_{N-1}\}$.

ii. In one example, a first syntax element is signaled to indicate whether mode B is applied. A second syntax element to indicate whether mode A is applied is signaled depending on whether mode B is applied.
1. In one example, the second syntax element is signaled only when mode B is applied.
2) A and B may share at least one computing logic to generate the blending weight mask.
a) In one example, the blending weight masks for A and B may be derived from the same loop-up-table.
3) A and B may share at least one computing logic to generate the motion storage mask.
a) In one example, the motion storage masks for A and B may be derived from the same loop-up-table.
b) In one example, at least one computing logic may be used to calculate the blending weights for both TPM mode and GEO mode.
i. In one example, the computing logic for TPM may be used for GEO.
1) Alternatively, the computing logic for GEO may be used for TPM.
c) In one example, at least one computing logic may be used to calculate the motion storage masks for both TPM mode and GEO mode.
i. In one example, the computing logic for TPM may be used for GEO.
1) Alternatively, the computing logic for GEO may be used for TPM.

Motion Storage Mask Generation of TPM/GEO

16. The motion vector storage mask of TPM may be generated in the same way as GEO.
a) Alternatively, the motion vector storage mask of GEO may be generated in the same way as TPM.
b) In one example, a motion vector storage mask to indicate the inter-prediction direction (such as uni-prediction or bi-prediction) for a specific combination of block width and block height may be generated and/or stored.
i. In one example, the motion vector storage mask may only be generated for allowable combination of block width and block height.
c) In one example, each element of a motion vector storage mask indicates which motion vector among the two sub-partitions is stored and/or how many motion vectors (such as one motion vector or two motion vectors), and/or the inter-prediction direction (such as uni-prediction or bi-prediction) are stored for a 4×4 sub-block.
d) In one example, the motion vector storage mask of TPM/GEO block may be pre-defined as N tables (such as N>0).
e) In one example, the motion vector storage mask of TPM/GEO block may be calculated from computing equations.
17. The motion vector of TPM/GEO may be stored in unit of 4×4.
a) In one example, each of the two sub-partitions of TPM/GEO has its own motion vector for motion compensation, however, the motion vector stored for spatial/temporal motion vector candidates is in unit of 4×4.
i. In one example, each 4×4 sub-block of TPM/GEO may have different motion vectors stored in buffer.

18. Both the L0 motion vector and L1 motion vector may be stored for sub-blocks belong to the blending area of TPM/GEO.
a) In one example, the blending area may indicate the region that are overlapped by both two sub-partitions.
b) In one example, for those 4×4 sub-blocks outside the blending area of a TPM/GEO block, uni-prediction (such as L0 or L1) motion vector of the sub-partition may be stored.
c) In one example, for those 4×4 sub-blocks belong to the blending area of a TPM/GEO block, bi-prediction motion vectors of both sub-partitions may be stored.
d) In one example, for those 4×4 sub-blocks belong to the blending area of a TPM/GEO block, if both sub-partitions have motion vectors from the same direction, the Min/Max/Average/Weighted motion vector among the two motion vectors may be stored.

Deblocking of TPM and GEO

19. Whether to and/or how to apply the deblocking process on a coding block may depend on whether the coding block is coded with TPM or GEO mode.
a) In one example, a boundary between two sub-blocks in two different partitions may be filtered in the deblocking filter stage.
i. In one example, Boundary Strength (BS) is equal to 1 in this case.
ii. In one example, Boundary Strength (BS) is equal to 2 in this case.
20. Deblocking may be triggered for a boundary between two sub-blocks in a TPM-coded/GEO-coded block.
a) In one example, if one of the two sub-blocks aside the inner TU edges of a TPM/GEO mode has non-zero coefficient, then deblocking may be triggered, regardless of whether there is motion difference between the two sub-blocks.
b) There may be no non-zero coefficients in both sub-blocks.
i. In one example, if the two sub-blocks aside the inner TU edges of a TPM/GEO mode have all zero coefficient, but the motion difference of the two sub-blocks is large enough, then deblocking may still be triggered.
ii. Alternatively, if the two sub-blocks aside the inner TU edges of a TPM/GEO mode have all zero coefficient, but the motion difference of the two sub-blocks is large enough, then deblocking may be NOT triggered.
c) Whether to trigger deblocking or not for an edge of two sub-blocks coded in TPM/GEO mode may be dependent on whether it is a TU edge or a MV edge of the two sub-blocks.
i. Deblocking may be triggered if the motion difference is large enough for an MV edge of a TPM/GEO mode.
ii. Deblocking may be triggered if there is non-zero coefficient exists in the sub-block asides to a TU edge of a TPM/GEO mode.
iii. When a filtering edge is both a TU edge or an MV edge, deblocking may be triggered if either one of below condition is meet
1) If the motion difference is large enough.
2) There is non-zero coefficient in either of the two sub-block asides.
d) The "TU edge" mentioned above denotes the actual transform unit edge, and "MV edge" mentioned above indicates a PU edge or a sub-block edge which is aligned with the filtering grid.

e) The "motion difference" mentioned above may indicate below cases.
   i. motion vector difference of the two sub-blocks is greater than T (such as T=1 pel, or ½ pel, or 8 in units of 1/16 luma samples)
   ii. different reference frame indexes
   iii. different reference POC
   iv. different number of reference frames.

On Configurable CTU Size and Maximum Transform Size

21. Whether to apply ISP or not may not dependent on the maximum transform size and/or minimum transform size.
   a) In one example, the signaling of ISP flag (such as intra_subpartitions_mode_flag) may NOT dependent on whether the width of current block is less than or equal to the maximum transform size, and/or may NOT dependent on whether the height of current block is less than or equal to maximum transform size.
   b) In one example, the signaling of ISP flag (such as intra_subpartitions_mode_flag) may NOT dependent on whether the width multiplied by the height of current block is greater than the square of the minimum transform size.
   c) In one example, the signaling of ISP flag (such as intra_subpartitions_mode_flag) may dependent on whether the width multiplied by the height of current block is greater than 16.
   d) In one example, the signaling of ISP flag (such as intra_subpartitions_mode_flag) may dependent on whether the width of current block is less than or equal to 64, and/or dependent on whether the height of current block is less than or equal to 64

22. ISP may be applied when the dimension of the coding block is greater than the maximum transform size.
   a) In one example, when the ISP coding block is greater than the maximum transform size, the ISP block may be implicitly split by a recursive way until the sub-partition reaches the size of 64.
   b) In one example, when the ISP coding block is greater than the maximum transform size, the ISP block may be implicitly split by a recursive way until the sub-partition reaches the size of maximum transform size.

23. CIIP and/or TPM and/or GEO may be applied when the dimension of the coding block is greater than or equal to 128.
   a) In one example, maximum CTU size may be set to greater than 128.
   b) In one example, CIIP may be used for blocks with block dimension greater than or equal to 128.
   c) In one example, TPM and/or GEO may be applied for blocks with block dimension greater than 128.

24. The merge data may be signaled when the dimension of the coding block is greater than 128.
   a) In one example, the merge flags (such as regular_merge_flag, mmvd_merge_flag, mmvd_cand_flag, mmvd_distance_idx, mmvd_direction_idx, merge_idx, ciip_flag, merge_triangle_split_dir, merge_triangle_idx0, merge_triangle_idx1) may be dependent on whether the dimension of the coding block is less than the maximum CTU size.

25. The value of pred_mode_ibc_flag may be inferred to be 0 if the block width and/or the block height are equal to or greater than X (such as X=64 or 128).
   a) In one example, the value of pred_mode_ibc_flag may be inferred to be 0 if the block width and the block height are greater than 64.
   b) In one example, the value of pred_mode_ibc_flag may be inferred to be 0 if the block width or the block height is greater than 64.

26. The cu_skip_flag and/or pred_mode_flag may be signalled when the dimension of coding block is greater than 128.

General Deblocking

27. Picture level deblocking parameter offsets for β and tC may be different for each component.
   a) In one example, picture level deblocking parameter offsets for luma, Cb and Cr may be different and indicated by different syntax elements.
   b) Alternatively, furthermore, the picture level deblocking parameter offset for joint_cb_cr coding mode may be different and indicated by a different syntax element.

28. Slice level deblocking parameter offsets for β and tC may be different for each component.
   a) In one example, slice level deblocking parameter offsets for luma, Cb and Cr may be different and indicated by different syntax element.
   b) Alternatively, furthermore, the picture level deblocking parameter offset for joint_cb_cr coding mode may be different and indicated by a different syntax element.

29. Chroma QP used to derive chroma deblocking parameters may be based on picture level chroma QP offset and CU-level chroma QP offset, but independent of slice level chroma QP offset.
   a) In one example, chroma QP used to derive chroma deblocking parameters may depend on pps_cb_qp_offset, pps_cr_qp_offset, pps_CbCr_qp_offset, CuQpOffset$_{Cb}$, CuQpOffset$_{Cr}$ and CuQpOffset$_{CbCr}$, but independent of slice_cb_qp_offset, slice_cr_qp_offset and slice_cbcr_qp_offset.

5. Embodiments

Below are example embodiments, which could be applied to VVC specification. The modifications are based on the latest WC working draft (JVET-O2001-v14). Newly added parts are highlighted in bold and Italic, and the deleted parts from WC working draft are marked with double brackets (e.g., [[a]] denotes the deletion of the character "a").

Embodiment #1 on TPM Luma and Chroma Weights Illustration

Figure 9:
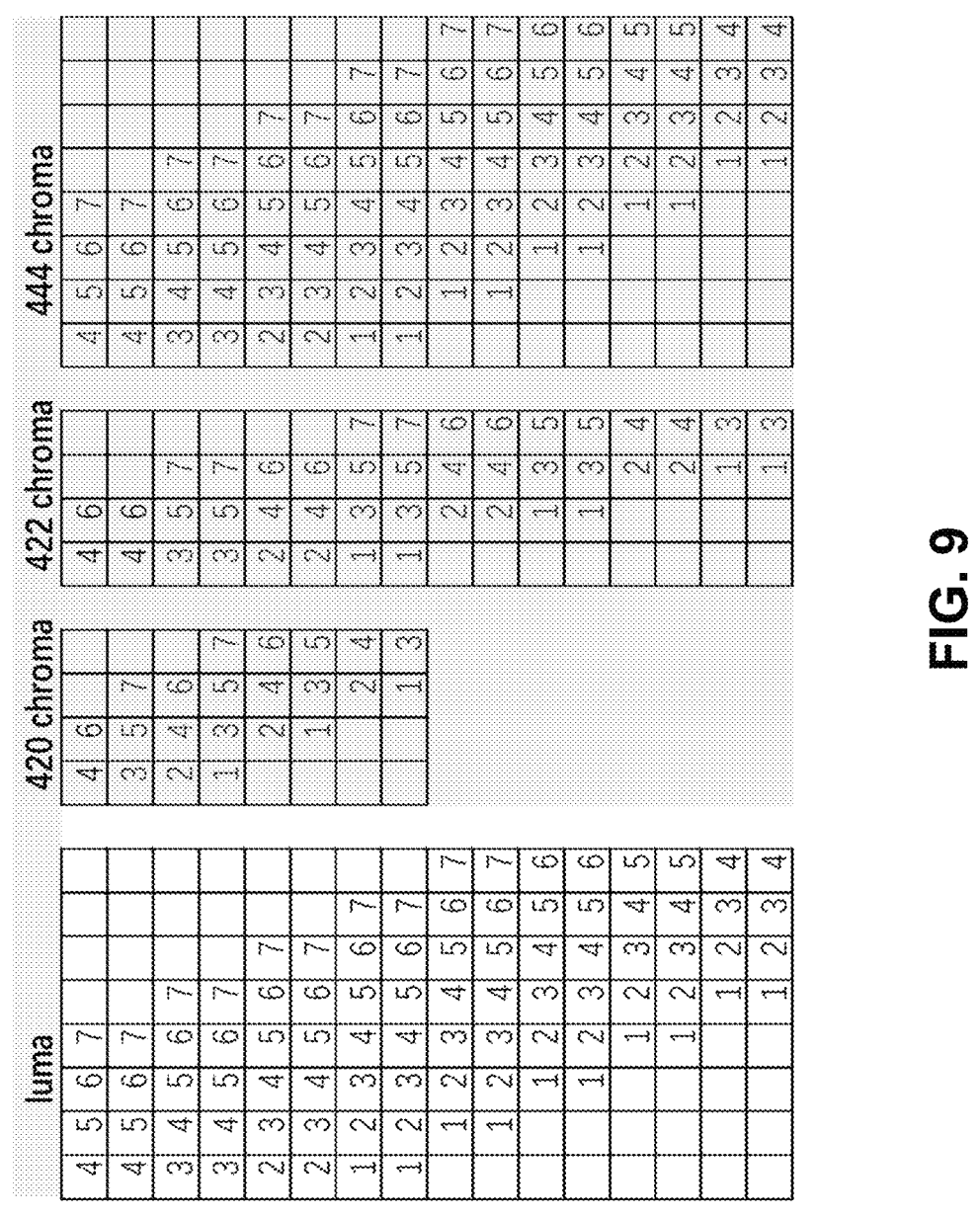

The TPM chroma weights align with luma weights according to block width, block height, and chroma sub-sampling ratio. FIG. 9 shows an example weights setting for an 8×16 TPM prediction block.

5.1. Embodiment #2 on TPM Chroma Weights Align with TPM Luma Weights 8.5.7 Decoding Process for Triangle Inter Blocks
8.5.7.1 General
This process is invoked when decoding a coding unit with MergeTriangleFlag[xCb][yCb] equal to 1.
Inputs to this process are:
   a luma location (xCb, yCb) specifying the top-left sample of the current coding block relative to the top-left luma sample of the current picture, a variable cbWidth specifying the width of the current coding block in luma samples,
   a variable cbHeight specifying the height of the current coding block in luma samples, the luma motion vectors in 1/16 fractional-sample accuracy mvA and mvB, the chroma motion vectors mvCA and mvCB, the reference indices refIdxA and refIdxB, the prediction list flags predListFlagA and predListFlagB.

Outputs of this process are:

an (cbWidth)×(cbHeight) array predSamples$_L$ of luma prediction samples, an (cbWidth/SubWidthC)×(cbHeight/SubHeightC) array predSamples$_{Cb}$ of chroma prediction samples for the component Cb, an (cbWidth/SubWidthC)×(cbHeight/SubHeightC) array predSamples$_{Cr}$ of chroma prediction samples for the component Cr.

Let predSamplesLA$_L$ and predSamplesLB$_L$ be (cbWidth)× (cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)× (cbHeight/SubHeightC) arrays of predicted chroma sample values.

The predSamples$_L$, predSamples$_{Cb}$ and predSamples$_{Cr}$ are derived by the following ordered steps:

1. For N being each of A and B, the following applies:

The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause *8.5.6.2* in VVC WD6 with X set equal to predListFlagN and refIdxX set equal to refIdxN as input.

The array predSamplesLN$_L$ is derived by invoking the fractional sample interpolation process specified in clause *8.5.6.3* with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set equal to FALSE, and the variable cIdx is set equal to 0 as inputs.

The array predSamplesLN$_{Cb}$ is derived by invoking the fractional sample interpolation process specified in clause *8.5.6.3* with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set equal to FALSE, and the variable cIdx is set equal to 1 as inputs.

The array predSamplesLN$_{Cr}$ is derived by invoking the fractional sample interpolation process specified in clause *8.5.6.3* with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set equal to FALSE, and the variable cIdx is set equal to 2 as inputs.

2. The partition direction of merge triangle mode variable triangleDir is set equal to merge_triangle_split_dir [xCb][yCb].

3. The prediction samples inside the current luma coding block, predSamplesL[xL][yL] with xL=0 . . . cbWidth−1 and yL=0 . . . cbHeight−1, are derived by invoking the weighted sample prediction process for triangle merge mode specified in clause *8.5.7.2* with the coding block width nCbW set equal to cbWidth, the coding block height nCbH set equal to cbHeight, the sample arrays predSamplesLAL and predSamplesLBL, and the variables triangleDir, and cIdx equal to 0 as inputs.

4. The prediction samples inside the current chroma component Cb coding block, predSamplesCb[xC][yC] with xC=0 . . . cbWidth/SubWidthC−1 and yC=0 . . . cbHeight/SubHeightC−1, are derived by invoking the weighted sample prediction process for triangle merge mode specified in clause *8.5.7.2* with the *luma* coding block width nCbW set equal to cbWidth, the *luma* coding block height nCbH set equal to cbHeight, the sample arrays predSamplesLACb and predSamplesLBCb, and the variables triangleDir, and cIdx equal to 1 as inputs.

5. The prediction samples inside the current chroma component Cr coding block, predSamplesCr[xC][yC] with xC=0 . . . cbWidth/SubWidthC−1 and yC=0 . . . cbHeight/SubHeightC−1, are derived by invoking the weighted sample prediction process for triangle merge mode specified in clause *8.5.7.2* with the *luma* coding block width nCbW set equal to cbWidth, the *luma* coding block height nCbH set equal to cbHeight, the sample arrays predSamplesLACr and predSamplesLBCr, and the variables triangleDir, and cIdx equal to 2 as inputs.

6. The motion vector storing process for merge triangle mode specified in clause *8.5.7.3* is invoked with the luma coding block location (xCb, yCb), the luma coding block width cbWidth, the luma coding block height cbHeight, the partition direction triangleDir, the luma motion vectors mvA and mvB, the reference indices refIdxA and refIdxB, and the prediction list flags predListFlagA and predListFlagB as inputs.

8.5.7.2 Weighted Sample Prediction Process for Triangle Merge Mode

Inputs to this process are:

two variables nCbW and nCbH specifying the width and the height of the current luma coding block, two (nCbW/*SubWidthC* ×(nCbH/*SubHeightC* arrays predSamplesLA and predSamplesLB, a variable triangleDir specifying the partition direction, a variable cIdx specifying colour component index.

Output of this process is the (nCbW/*SubWidthC* ×(nCbH/ *SubHeightC* array pbSamples of prediction sample values.

The variable nCbR is derived as follows:

$$nCbR = (nCbW > nCbH) ? (nCbW/nCbH) : (nCbH/nCbW)$$

(8-841)

The variable bitDepth is derived as follows:

If cIdx is equal to 0, bitDepth is set equal to BitDepth$_Y$.

Otherwise, bitDepth is set equal to BitDepth$_C$.

Variables shift1 and offset1 are derived as follows:

The variable shift1 is set equal to Max(5, 17−bitDepth).

The variable offset1 is set equal to 1<<(shift1−1).

Depending on the values of triangleDir, the prediction samples pbSamples[x][y] with x=0 . . . nCbW/*SubWidthC* −1 and y=0 . . . nCbH/*SubHeightC* −1 are derived as follows:
- *The variables xIdx and* *yIdx are derived as follows:*

*xIdx = (cIdx ==0) ? X:x* *\*SubWidthC*

*YIdx = (cIdx ==0) ? Y:y \* SubHeightC*

The variable *wValue specifying the weight of the prediction sample* is derived as follows:
If triangleDir is equal to 0, the following applies:

*wValue* =(*nCbW*>*nCbH*)?(Clip3(0,8,(*xIdx*/*nCbR*−*yIdx*)+4)):(Clip3(0,8,(*xIdx*−*yIdx*/*nCbR*)+4))  (8-842)

Otherwise (triangleDir is equal to 1), the following applies:

*wValue* =(*nCbW*>*nCbH*)?(Clip3(0,8,(*nCbH*−1−*xIdx*/*nCbR*−*yIdx*)+4)) (Clip3(0,8,(*nCbW*−1−*xIdx*−*yIdx*/*nCbR*)+4))  (8-843)

The prediction sample values are derived as follows:

*pb*Samples[*x*][*y*]=Clip3(0,(1<<bitDepth)−1,(predSamples*LA*[*x*][*y*]*wValue+predSamples*LB*[*x*][*y*]*(8−*w*Value)+offset1)>>shift1)  (8-847)

5.2. Embodiment #3 on TPM Conditioned on Block Width Height Ratio 7.3.8.7 Merge Data Syntax

|  | Descriptor |
|---|---|
| merge_data( x0, y0, cbWidth, cbHeight, chType ) { | |
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblockflag[ x0 ][ y0 ] | ae(v) |
|     if( merge_subblock_flag[ x0 ][ y0 ] = = 1 ) { | |
|       if( MaxNumSubblockMergeCand > 1) | |
|         merge_subblock_idx[ x0 ][ y0 ] | ae(v) |
|     } else { | |
|       if( ( cbWidth * cbHeight) >= 64 && ( (sps_ciip_enabled_flag && | |
|       cu_skip_flag[ x0 ][ y0 ] = = 0 && cbWidth < 128 && cbHeight < 128) \|\| | |
|       ( sps_triangle_enabled_flag && MaxNumTriangleMergeCand > 1 && | |
|       slice_type = = B && | |
|         *Abs(Log2(cbWidth)-Log2(cbHeight) ) <=2) ) )* | |
|       regular_merge_flag[ x0 ][ y0 ] | ae(v) |
|     if ( regular_merge_flag[ x0 ][ y0 ] = =1 ){ | |
|       if( sps_mmvd_enabled_flag ) | |
|         mmvd_merge_flag[ x0 ][ y0 ] | ae(v) |
|       if( mmvd_merge_flag[ x0 ][ y0 ] = =1 ) { | |
|         if( MaxNumMergeCand > 1) | |
|           mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|       } else { | |
|         if( MaxNumMergeCand > 1 ) | |
|           merge_idx[ x0 ][ y0 ] | ae(v) |
|       } | |
|     } else { | |
|       if( sps_ciip_enabled_flag && sps_triangle_enabled_flag && | |
|       MaxNumTriangleMergeCand > 1 && slice_type = = B && | |
|       cu_skip_flag[ x0 ][ y0 ] = = 0 && | |
|       ( cbWidth * cbHeight) >= 64 && cbWidth < 128 && cbHeight < 128 && | |
|         *Abs(Log2(cbWidth)-Log2(cbHeight) ) <=2) ){* | |
|       ciip_flag[ x0 ][ y0 ] | ae(v) |
|       if( ciip_flag[ x0 ][ y0 ] && MaxNumMergeCand > 1 ) | |
|         merge_idx[ x0 ][ y0 ] | ae(v) |
|       if( !ciip_flag[ x0 ][ y0 ] && MaxNumTriangleMergeCand > 1) { | |
|         merge_triangle_split_dir[ x0 ][ y0 ] | ae(v) |
|         merge_triangle_idx0[ x0 ][ y0 ] | ae(v) |
|         merge_triangle_idx1[ x0 ][ y0 ] | ae(v) |
|       } | |
|     } | |
|   } | |
| } | |

7.4.9.7 Merge Data Semantics

The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
merge_subblock_flag[x0][y0] is equal to 0.
ciip_flag[x0][y0] is equal to 0.
*Abs(Log2( cbWidth) - Log2(cbHeight )) is less than or equal to 2*
Otherwise, MergeTriangleFlag[x0][y0] is set equal to 0.

5.3. Embodiment #4 on TPM Conditioned on Block Width<128 and Height<128

7.4.9.7 Merge Data Semantics

The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
merge_subblock_flag[x0][y0] is equal to 0.
ciip_flag[x0][y0] is equal to 0.
*cbWidth is less than 128.*
*cbHeight is less than 128.*
Otherwise, MergeTriangleFlag[x0][y0] is set equal to 0.

7.3.8.7 Merge Data Syntax

|  | Descriptor |
|---|---|
| merge_data( x0, y0, cbWidth, cbHeight, chType ) { |  |
|   if ( CuPredMode[ chType ][ x0 ][ y0 ] = = MODE_IBC ) { |  |
|     if( MaxNumIbcMergeCand > 1 ) |  |
|       merge_idx[ x0 ][ y0 ] | ae(v) |
|   } else { |  |
|     if( MaxNumSubblockMergeCand > 0 && cbWidth >= 8 && cbHeight >= 8 ) |  |
|       merge_subblockflag[ x0 ][ y0 ] | ae(v) |
|     if( merge_subblock_flag[ x0 ][ y0 ] = = 1 ) { |  |
|       if( MaxNumSubblockMergeCand > 1) |  |
|         merge_subblock_idx[ x0 ][ y0 ] | ae(v) |
|     } else { |  |
|       if( ( cbWidth * cbHeight) >= 64***&& cbWidth < 128 && cbHeight < 128*** && ( (sps_ciip_enabled_flag && |  |
|         cu_skip_flag[ x0 ][ y0 ] = = 0 [[&& cbWidth <128 && cbHeight <128]]) || |  |
|         ( sps_triangle_enabled_flag && MaxNumTriangleMergeCand > 1 && slice_type = = B ) ) ) |  |
|         regular_merge_flag[ x0 ][ y0 ] | ae(v) |
|       if ( regular_merge_flag[ x0 ][ y0 ] = = 1 ) { |  |
|         if( sps_mmvd_enabled_flag ) |  |
|           mmvd_merge_flag[ x0 ][ y0 ] | ae(v) |
|         if( mmvd_merge_flag[ x0 ][ y0 ] = = 1 ) { |  |
|           if( MaxNumMergeCand > 1 ) |  |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { |  |
|           if( MaxNumMergeCand > 1 ) |  |
|             merge_idx[ x0 ][ y0 ] | ae(v) |
|         } |  |
|       } else { |  |
|         if( sps_ciip_enabled_flag && sps_triangle_enabled_flag && MaxNumTriangleMergeCand > 1 && slice_type = = B && cu_skip_flag[ x0 ][ y0 ] = = 0 && ( cbWidth * cbHeight) >= 64 && cbWidth < 128 && cbHeight < 128 ) |  |
|         { |  |
|           ciip_flag[ x0 ][ y0 ] | ae(v) |
|         if( ciip_flag[ x0 ][ y0 ] && MaxNumMergeCand > 1 ) |  |
|           merge_idx[ x0 ][ y0 ] | ae(v) |
|         if( !ciip_flag[ x0 ][ y0 ] && MaxNumTriangleMergeCand > 1) { |  |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } |  |
|       } |  |
|     } |  |
|   } |  |
| } |  |

5.4. Embodiment #5 on TPM Conditioned on Block Width>4 and Height>4

7.3.8.7 Merge Data Syntax

|  | Descriptor |
|---|---|
| merge_data( x0, y0, cbWidth, cbHeight, chType ) { | |
|   if ( CuPredMode[ chType ][ x0 ][ y0 ] == MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight) >= 64 && ( (sps_ciip_enabled_flag && | |
|       cu_skip_flag[ x0 ][ y0 ] == 0 && cbWidth < 128 && cbHeight < 128) \|\| | |
|       ( sps_triangle_enabled_flag && MaxNumTriangleMergeCand > 1 && | |
|       slice_type == B && | |
|       *CbWidth> 4 && cbHeight> 4) ) )* | |
|       regular_merge_flag[ x0 ][ y0 ] | ae(v) |
|       if ( regular_merge_flag[ x0 ][ y0 ] == 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] == 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && | |
|         MaxNumTriangleMergeCand > 1 && slice_type == B && | |
|         cu_skip_flag[ x0 ][ y0 ] == 0 && | |
|         ( cbWidth * cbHeight) >= 64 && cbWidth < 128 && cbHeight < 128 && | |
|         *CbWidth > 4 && cbHeight > 4) )){* | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | |

7.4.9.7 Merge Data Semantics

The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
- sps_triangle_enabled_flag is equal to 1.
- slice_type is equal to B.
- general_merge_flag[x0][y0] is equal to 1.
- MaxNumTriangleMergeCand is greater than or equal to 2.
- cbWidth*cbHeight is greater than or equal to 64.
- regular_merge_flag[x0][y0] is equal to 0.
- merge_subblock_flag[x0][y0] is equal to 0.
- ciip_flag[x0][y0] is equal to 0.
- *cbWidth is greater than 4*
- *cbHeight is greater than 4*

Otherwise, MergeTriangleFlag[x0][y0] is set equal to 0.

5.5. Embodiment #6 on ISP Signaling Independent with the Minimum Transform Size and Maximum Transform Size 7.3.8.5 Coding Unit Syntax

|  | Descriptor |
|---|---|
| coding_unit( x0, y0, cbWidth, cbHeight, cqtDepth, treeType, modeType ) { | |
|   ... | |
|   else { | |
|     if( sps_mrl_enabled_flag && ( ( y0 % CtbSizeY ) > 0 ) ) | |

-continued

|  | Descriptor |
|---|---|
| intra_luma_ref_idx[ x0 ][ y0 ] | ae(v) |
| if ( sps_isp_enabled_flag && intra_luma_ref_idx[ x0 ][ y0 ] = = 0 [[&& | |
|   ( cbWidth <= MaxTbSizeY && cbHeight <= MaxTbSizeY )]] && | |
|   ( cbWidth * cbHeight > MinTbSizeY * MinTbSizeY ) ) | |
|   intra_subpartitions_mode_flag[ x0 ][ y0 ] | ae(v) |
| if( intra_subpartitions_mode_flag[ x0 ][ y0 ] = = 1 ) | |
|   intra_subpartitions_split_flag[ x0 ][ y0 ] | ae(v) |
| if( intra_luma_ref_idx[ x0 ][ y0 ] = = 0 ) | |
|   intra_luma_mpm_flag[ x0 ][ y0 ] | ae(v) |
| if( intra_luma_mpm_flag[ x0 ][ y0 ] ) { | |
|   if( intra_luma_ref_idx[ x0 ][ y0 ] = = 0 ) | |
|     intra_luma_not_planar_flag[ x0 ][ y0 ] | ae(v) |
|   if( intra_luma_not_planar_flag[ x0 ][ y0 ] ) | |
|     intra_luma_mpm_idx[ x0 ][ y0 ] | ae(v) |
| } else | |
| ... | |

5.6. Embodiment #7 on ISP Applied to Blocks Larger than Maximum Transform Size 7.3.8.6 Coding Unit Syntax

|  | Descriptor |
|---|---|
| coding_unit( x0, y0, cbWidth, cbHeight, cqtDepth, treeType, modeType ) { | |
| ... | |
|   else { | |
|     if( sps_mrl_enabled_flag && ( ( y0 % CtbSizeY ) > 0 ) ) | |
|       intra_luma_ref_idx[ x0 ][ y0 ] | ae(v) |
|     if ( sps_isp_enabled_flag && intra_luma_ref_idx[ x0 ][ y0 ] = = 0 && | |
|       ( cbWidth <= [[MaxTbSizeY]] 64 && cbHeight <= [[MaxTbSizeY]] 64 ) && | |
|       ( cbWidth * cbHeight > MinTbSizeY * MinTbSizeY ) ) | |
|       intra_subpartitions_mode_flag[ x0 ][ y0 ] | ae(v) |
|     if( intra_subpartitions_mode_flag[ x0 ][ y0 ] = = 1 ) | |
|       intra_subpartitions_split_flag[ x0 ][ y0 ] | ae(v) |
|     if( intra_luma_ref_idx[ x0 ][ y0 ] = = 0 ) | |
|       intra_luma_mpm_flag[ x0 ][ y0 ] | ae(v) |
|     if( intra_luma_mpm_flag[ x0 ][ y0 ] ) { | |
|       if( intra_luma_ref_idx[ x0 ][ y0 ] = = 0 ) | |
|         intra_luma_not_planar_flag[ x0 ][ y0 ] | ae(v) |
|       if( intra_luma_not_planar_flag[ x0 ][ y0 ] ) | |
|         intra_luma_mpm_idx[ x0 ][ y0 ] | ae(v) |
|     } else | |
| ... | |

5.7. Embodiment #8 on ISP Applied to Block Size Greater than 16 Pixels 7.3.8.7 Coding Unit Syntax

|  | Descriptor |
|---|---|
| coding_unit( x0, y0, cbWidth, cbHeight, cqtDepth, treeType, modeType ) { | |
| ... | |
|   else { | |
|     if( sps_mrl_enabled_flag && ( ( y0 % CtbSizeY ) > 0 ) ) | |
|       intra_luma_ref_idx[ x0 ][ y0 ] | ae(v) |
|     if ( sps_isp_enabled_flag && intra_luma_ref_idx[ x0 ][ y0 ] = = 0 && | |
|       ( cbWidth <= MaxTbSizeY && cbHeight <= MaxTbSizeY) && | |
|       ( cbWidth * cbHeight > [[MinTbSizeY * MinTbSizeY]] 16 ) ) | |
|       intra_subpartitions_mode_flag[ x0 ][ y0 ] | ae(v) |
|     if( intra_subpartitions_mode_flag[ x0 ][ y0 ] = = 1 ) | |
|       intra_subpartitions_split_flag[ x0 ][ y0 ] | ae(v) |
|     if( intra_luma_ref_idx[ x0 ][ y0 ] = = 0 ) | |
|       intra_luma_mpm_flag[ x0 ][ y0 ] | ae(v) |
|     if( intra_luma_mpm_flag[ x0 ][ y0 ] ) { | |
|       if( intra_luma_ref_idx[ x0 ][ y0 ] = = 0 ) | |

| | Descriptor |
|---|---|
| intra_luma_not_planar_flag[ x0 ][ y0 ] | ae(v) |
| if( intra_luma_not_planar_flag[ x0 ][ y0 ] ) | |
|     intra_luma_mpm_idx[ x0 ][ y0 ] | ae(v) |
| } else | |
| ... | |

5.8. An Example of MV Rounding

Changes on the Working Draft

The working draft specified in JVET-O2001-v14 are changed as below. The newly added parts are highlighted in bold and Italic. The removed parts are marked with double brackets.

8.5.5.3 Derivation Process for Subblock-Based Temporal Merging Candidates

Inputs to this process are:

. . . .

Outputs of this process are:

. . . .

*The rounding process for motion vectors as specified in clause 8.5.2.14 is invoked with mvX set equal to tempMv[ 0 ], rightShift set equal to 4, and leftShift set equal to 0 as inputs and the rounded tempMv[ 0 ] as output.*

*The rounding process for motion vectors as specified in clause 8.5.2.14 is invoked with mvX set equal to tempMv[ 1 ], rightShift set equal to 4, and leftShift set equal to 0 as inputes and the rounded tempMv[ 1 ] as output.*

For xSbIdx=0 ... numSbX-1 and ySbIdx=0 ... numSbY-1, the motion vectors mvLXSbCol[xSbIdx][ySbIdx] and prediction list utilization flags predFlagLXSbCol[xSbIdx][ySbIdx] are derived as follows:

The luma location (xSb, ySb) specifying the top-left sample of the current coding subblock relative to the top-left luma sample of the current picture is derived as follows:

$$xSb = xCb + xSbIdx * sbWidth + sbWidth/2 \quad (8\text{-}551)$$

$$ySb = yCb + ySbIdx * sbHeight + sbHeight/2 \quad (8\text{-}552)$$

The location (xColSb, yColSb) of the collocated subblock inside ColPic is derived as follows.

The following applies:

$$yColSb = \text{Clip3}(yCtb, \text{Min}(\text{CurPicHeightInSamples}Y-1, yCtb+(1<<Ctb\ \text{Log}\ 2\text{Size}Y)-1), ySb+tempMv[1]) \quad (8\text{-}553)$$

If subpic_treated_as_pic_flag[SubPicIdx] is equal to 1, the following applies:

$$xColSb = \text{Clip3}(xCtb, \text{Min}(\text{SubPicRightBoundaryPos}, xCtb+(1<<Ctb\ \text{Log}\ 2\text{Size}Y)+3), xSb+tempMv[0]) \quad (8\text{-}554)$$

Otherwise (subpic_treated_as_pic_flag[SubPicIdx] is equal to 0), the following applies:

$$xColSb = \text{Clip3}(xCtb, \text{Min}(\text{CurPicWidthInSamples}Y-1, xCtb+(1<<Ctb\ \text{Log}\ 2\text{Size}Y)+3), xSb+tempMv[0]) \quad (8\text{-}555)$$

8.5.5.4 Derivation Process for Subblock-Based Temporal Merging Base Motion Data

Inputs to this process are:

. . . .

Outputs of this process are:

. . . .

The variable tempMv is set as follows:

$$tempMv[0]=0 \quad (8\text{-}558)$$

$$tempMv[1]=0 \quad (8\text{-}559)$$

The variable currPic specifies the current picture.

When available FlagA$_1$ is equal to TRUE, the following applies:

If all of the following conditions are true, tempMv is set equal to mvL0A$_1$:
    predFlagL0A$_1$ is equal to 1,
    DiffPicOrderCnt(ColPic, RefPicList[0][refIdxL0A$_1$]) is equal to 0, Otherwise, if all of the following conditions are true, tempMv is set equal to mvL1A$_1$:
    slice_type is equal to B,
    predFlagL1A$_1$ is equal to 1,
    DiffPicOrderCnt(ColPic, RefPicList[1][refIdxL1A$_1$]) is equal to 0.

*The rounding process for motion vectors as specified in clause 8.5.2.14 is invoked with mvX set equal to tempMv[0], rightShift set equal to 4 and leftShift set equal to 0 as inputs and the rounded tempMv[0] as output*

*The rounding process for motion vectors as specified in clause 8.5.2.14 is invoked with mvX set equal to tempMv[0], rightShift set equal to 4 and leftShift set equal to 0 as inputs and the rounded tempMv[1] as output*

The location (xColCb, yColCb) of the collocated block inside ColPic is derived as follows.

The following applies:

$$yColCb = \text{Clip3}(yCtb, \text{Min}(\text{CurPicHeightInSamples}Y-1, yCtb+(1<<Ctb\ \text{Log}\ 2\text{Size}Y)-1), yColCtrCb+tempMv[1]) \quad (8\text{-}560)$$

If subpic_treated_as_pic_flag[SubPicIdx] is equal to 1, the following applies:

$$xColCb = \text{Clip3}(xCtb, \text{Min}(\text{SubPicRightBoundaryPos}, xCtb+(1<<Ctb\ \text{Log}\ 2\text{Size}Y)+3), xColCtrCb+tempMv[0]) \quad (8\text{-}561)$$

Otherwise (subpic_treated_as_pic_flag[SubPicIdx] is equal to o, the following applies:

$$xColCb = \text{Clip3}(xCtb, \text{Min}(\text{CurPicWidthInSamples}Y-1, xCtb+(1<<Ctb\ \text{Log}\ 2\text{Size}Y)+3), xColCtrCb+tempMv[0]) \quad (8\text{-}562)$$

5.9. An Example of Sub-TMVP 8.5.5.2 Derivation Process for Motion Vectors and Reference Indices in Subblock Merge Mode Inputs to this process are:
- a luma location (xCb, yCb) of the top-left sample of the current luma coding block relative to the top-left luma sample of the current picture,
- two variables cbWidth and cbHeight specifying the width and the height of the luma coding block.

Outputs of this process are:
- the number of luma coding subblocks in horizontal direction numSbX and in vertical direction numSbY,
- the reference indices refIdxL0 and refIdxL1,
- the prediction list utilization flag arrays predFlagL0[xSbIdx][ySbIdx] and predFlagL1[xSbIdx][ySbIdx],
- the luma subblock motion vector arrays in 1/16 fractional-sample accuracy mvL0[xSbIdx][ySbIdx] and mvL1[xSbIdx][ySbIdx] with xSbIdx=0 ... numSbX−1, ySbIdx=0 ... numSbY−1,
- the chroma subblock motion vector arrays in 1/32 fractional-sample accuracy mvCL0[xSbIdx][ySbIdx] and mvCL1[xSbIdx][ySbIdx] with xSbIdx=0 ... numSbX−1, ySbIdx=0 ... numSbY−1,
- the bi-prediction weight index bcwIdx.

*The variables numSbXAff and numSbYAff are set as below.*
*numSbXAff=cbWidth >>2*
*numSbYAff = cbHeight>>2*

The variables numSbX, numSbY and the subblock merging candidate list, subblockMergeCandList are derived by the following ordered steps:

1. When sps_sbtmvp_enabled_flag is equal to 1, the following applies:

For the derivation of availableFlagA$_1$, refIdxLXA$_1$, predFlagLXA$_1$ and mvLXA$_1$ the following applies:

The luma location (xNbA$_1$, yNbA$_1$) inside the neighbouring luma coding block is set equal to (xCb−1, yCb+cbHeight−1).

The derivation process for neighbouring block availability as specified in clause 6.4.4 is invoked with the current luma location (xCurr, yCurr) set equal to (xCb, yCb), the neighbouring luma location (xNbA$_1$, yNbA$_1$), checkPredModeY set equal to TRUE, and cIdx set equal to 0 as inputs, and the output is assigned to the block availability flag availableA$_1$.

The variables availableFlagA$_1$, refIdxLXA$_1$, predFlagLXA$_1$ and mvLXA$_1$ are derived as follows:

If availableA$_1$ is equal to FALSE, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, and bcwIdxA$_1$ is set equal to 0.

Otherwise, availableFlagA$_1$ is set equal to 1 and the following assignments are made:

$$mvLXA_1 = MvLX[xNbA_1][yNbA_1] \qquad (8\text{-}498)$$

$$refIdxLXA_1 = RefIdxLX[xNbA_1][yNbA_1] \qquad (8\text{-}499)$$

$$predFlagLXA_1 = PredFlagLX[xNbA_1][yNbA_1] \qquad (8\text{-}500)$$

The derivation process for subblock-based temporal merging candidates as specified in clause 8.5.5.3 is invoked with the luma location (xCb, yCb), the luma coding block width cbWidth, the luma coding block height cbHeight, the availability flag availableFlagA$_1$, the reference index refIdxLXA$_1$, the prediction list utilization flag predFlagLXA$_1$, and the motion vector mvLXA$_1$ as inputs and the output being the availability flag availableFlagSbCol, the number of luma coding subblocks in horizontal direction *numSbXCol* and in vertical direction *num SbYcol* the reference indices refIdxLXSbCol, the luma motion vectors mvLXSbCol[xSbIdx][ySbIdx] and the prediction list utilization flags predFlagLXSbCol[xSbIdx][ySbIdx] with xSbIdx=0 ... *numSbXCol* −1, ySbIdx=0 ... *num SbYcol* −1 and X being 0 or 1.

2. When sps_affine_enabled_flag is equal to 1, the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$), (xNbB$_3$, yNbB$_3$), and the variables *numSbXAff* and *numSbYAff* are derived as follows:

$$(xA_0, yA_0) = (xCb-1, yCb+cbHeight) \qquad (8\text{-}501)$$

$$(xA_1, yA_1) = (xCb-1, yCb+cbHeight-1) \qquad (8\text{-}502)$$

$$(xA_2, yA_2) = (xCb-1, yCb) \qquad (8\text{-}503)$$

$$(xB_0, yB_0) = (xCb+cbWidth, yCb-1) \qquad (8\text{-}504)$$

$$(xB_1, yB_1) = (xCb+cbWidth-1, yCb-1) \qquad (8\text{-}505)$$

$$(xB_2, yB_2) = (xCb-1, yCb-1) \qquad (8\text{-}506)$$

$$(xB_3, yB_3) = (xCb, yCb-1) \qquad (8\text{-}507)$$

3. When sps_affine_enabled_flag is equal to 1, the variable availableFlagA is set equal to FALSE and the following applies for (xNbA$_k$, yNbA$_k$) from (xNbA$_0$, yNbA$_0$) to (xNbA$_1$, yNbA$_1$):

. . . .

8. When numCurrMergeCand is less than MaxNumSubblockMergeCand, the following is repeated until numCurrMergeCand is equal to MaxNumSubblockMergeCand, with mvZero[0] and mvZero[1] both being equal to 0:

The reference indices, the prediction list utilization flags and the motion vectors of zeroCand$_m$ with m equal to (numCurrMergeCand−numOrigMergeCand) are derived as follows:

$$refIdxL0ZeroCand_m = 0 \qquad (8\text{-}515)$$

$$predFlagL0ZeroCand_m = 1 \qquad (8\text{-}516)$$

$$cpMvL0ZeroCand_m[0] = mvZero \qquad (8\text{-}517)$$

$$cpMvL0ZeroCand_m[1] = mvZero \qquad (8\text{-}518)$$

$$cpMvL0ZeroCand_m[2] = mvZero \qquad (8\text{-}519)$$

$$refIdxL1ZeroCand_m = (slice\_type == B) ? 0 : -1 \qquad (8\text{-}520)$$

$$predFlagL1ZeroCand_m = (slice\_type == B) ? 1 : 0 \qquad (8\text{-}521)$$

$$cpMvL1ZeroCand_m[0] = mvZero \qquad (8\text{-}522)$$

$$cpMvL1ZeroCand_m[1] = mvZero \qquad (8\text{-}523)$$

$$cpMvL1ZeroCand_m[2] = mvZero \qquad (8\text{-}524)$$

$$motionModelIdcZeroCand_m = 1 \qquad (8\text{-}525)$$

$$bcwIdxZeroCand_m = 0 \qquad (8\text{-}526)$$

The candidate zeroCand$_m$ with m equal to (num-CurrMergeCand−numOrigMergeCand) is added at the end of subblockMergeCandList and numCurrMerge-Cand is incremented by 1 as follows:

subblockMergeCandList[numCurrMerge
Cand++]=zeroCand$_m$ (8-527)

The variables refIdxL0, refIdxL1, predFlagL0[xSbIdx][ySbIdx], predFlagL1[xSbIdx][ySbIdx], mvL0[xSbIdx][ySbIdx], mvL1[xSbIdx][ySbIdx], mvCL0[xSbIdx][ySbIdx], and mvCL1[xSbIdx][ySbIdx] with xSbIdx=0 . . . numSbX−1, ySbIdx=0 . . . numSbY−1 are derived as follows:

If subblockMergeCandList[merge_subblock_idx[xCb][yCb] ] is equal to SbCol, *numSbX is set equal to numSbXCol, numSbY is set equal to numSbYCol,* the bi-prediction weight index bcwIdx is set equal to 0 and the following applies with X being 0 or 1:

refIdxLX=refIdxLXSbCol (8-528)

For xSbIdx=0 . . . numSbX−1, ySbIdx=0 . . . numSbY−1, the following applies:

predFlagLX[xSbIdx][ySbIdx]=predFlagLXSbCol[xSbIdx][ySbIdx] (8-529)

mvLX[xSbIdx][ySbIdx][0]=mvLXSbCol[xSbIdx][ySbIdx][0] (8-530)

mvLX[xSbIdx][ySbIdx][1]=mvLXSbCol[xSbIdx][ySbIdx][1] (8-531)

When predFlagLX[xSbIdx][ySbIdx], is equal to 1, the derivation process for chroma motion vectors in clause 8.5.2.13 is invoked with mvLX[xSbIdx][ySbIdx] and refIdxLX as inputs, and the output being mvCLX[xSbIdx][ySbIdx].

The following assignment is made for x=xCb . . . xCb+cbWidth−1 and y=yCb . . . yCb+cbHeight−1:

MotionModelIdc[x][y]=0 (8-532)

Figure 10:
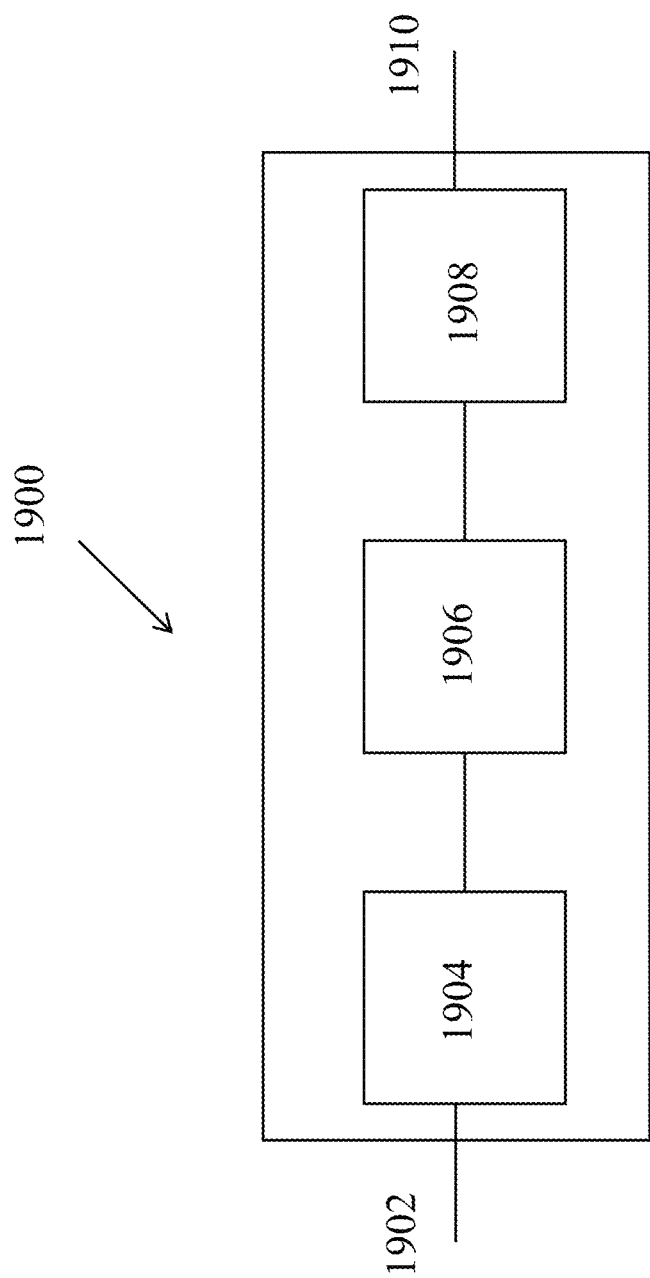
FIG. 10 is a block diagram of an example video processing system in which disclosed techniques may be implemented.

Otherwise (subblockMergeCandList[merge_subblock_idx[xCb][yCb] ] is not equal to SbCol), *numSbX is set equal to numSbXAff, numSbY is set equal to numSbYAff and* the following applies with X being 0 or 1:

The following assignments are made with N being the candidate at position merge_subblock_idx[xCb][yCb] in the subblock merging candidate list subblockMergeCandList (N=subblockMergeCandList[merge_subblock_idx[xCb][yCb] ]):

FIG. 10 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 11:
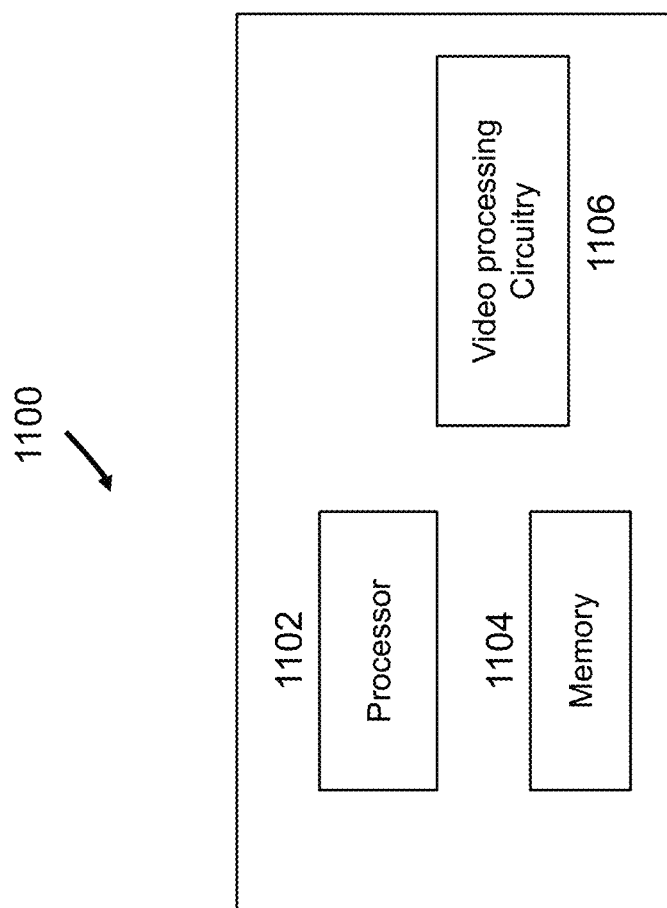
FIG. 11 is a block diagram of an example implementation of a hardware platform for video processing.

FIG. 11 is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document. In some embodiments, the hardware 1106 may be at least partially within the processor 1102, e.g., a graphics co-processor.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The following first set of clauses may be implemented in some embodiments.

The following clauses may be implemented together with additional techniques described in items listed in the previous section (e.g., item 1).

Figure 12:
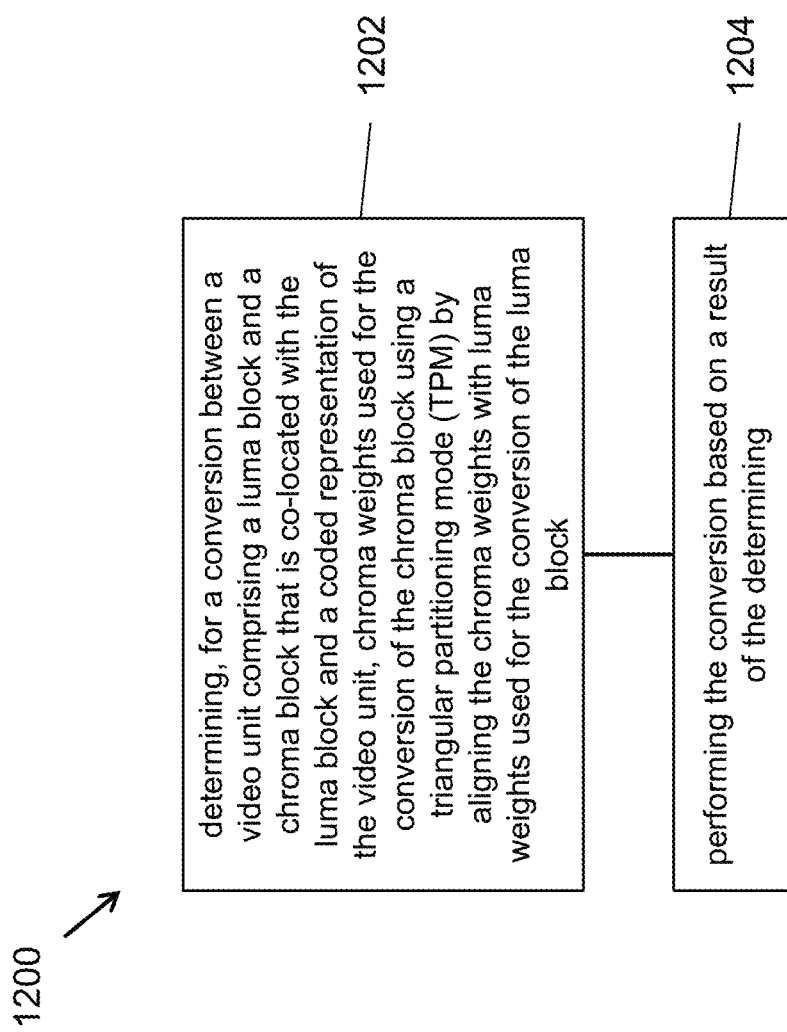
FIG. 12 is a flowchart for an example method of video processing.

1. A method of video processing (e.g., method 1200 shown in FIG. 12), comprising: determining (1202), for a conversion between a video unit comprising a luma block and a chroma block that is co-located with the luma block and a coded representation of the video unit, chroma weights used for the conversion of the chroma block using a triangular partitioning mode (TPM) by aligning the chroma weights with luma weights used for the conversion of the luma block; and performing (1204) the conversion based on a result of the determining.

2. The method of clause 1, wherein the chroma weights are determined as a function of the luma weights.

3. The method of any of clauses 1-2, wherein the chroma weights are a subset of the luma weights.

4. The method of any of clauses 1-3, wherein chroma weights are equal to luma weights for a equal-sized portion of the luma block that coincides with the chroma block.

The following clauses may be implemented together with additional techniques described in items listed in the previous section (e.g., item 2).

5. A method of video processing, comprising: determining, for a conversion between a video unit comprising a luma block and a chroma block that is co-located with the luma block and a coded representation of the video unit, chroma weights used for the conversion of the chroma block using a triangular partitioning mode (TPM) based on a characteristic of the luma block or a characteristic of the video unit; and performing the conversion based on a result of the determining.

6. The method of clause 5, wherein the characteristic of the luma block includes a height or a width of the luma block.

7. The method of any of clauses 5-6, wherein the characteristic of the video unit includes a color format of the video unit or a chroma subsampling ratio of the video unit.

8. The method of any of clauses 5-7, wherein the chroma weights further depend on a color component identity of the chroma block.

The following clauses may be implemented together with additional techniques described in items listed in the previous section (e.g., item 3).

9. The method of any of clauses 1-8, wherein the chroma weights and/or the luma weights are equal to an integer.

The following clauses may be implemented together with additional techniques described in items listed in the previous section (e.g., item 4).

10. A method of video processing, comprising: determining, for a conversion between a video unit of a video comprising a luma block and a chroma block that is co-located with the luma block and a coded representation of the video unit, whether a triangular partitioning mode (TPM) is used for the conversion based on a characteristic the video unit; and performing the conversion based on a result of the determining.

11. The method of clause 10, wherein the characteristic is a dimension ratio is equal to max(H,W)/min(H, W), where max and min are maximum and minimum functions, and H and W are a height and a width in pixels of the video unit.

12. The method of clause 10, wherein the characteristic is a dimension ratio is equal to Abs(Log 2(cbWidth)−Log 2(cbHeight)), where Abs is absolute function, cbWidth and cbHeight are a pixel width and a pixel height of the chroma block.

13. The method of clause 10, wherein the result of the determining is that the TPM is disabled due to the dimension ratio being greater than 2.

The following clauses may be implemented together with additional techniques described in items listed in the previous section (e.g., item 5).

14. The method of clause 10, wherein the characteristic of the video unit comprises a maximum transform size used for the conversion of the video.

15. The method of clause 14, wherein the determining disables use of the TPM due to the video unit having a height or a width greater than the maximum transform size.

The following clauses may be implemented together with additional techniques described in items listed in the previous section (e.g., item 6).

16. The method of clause 10, wherein the characteristic of the video unit comprises a maximum coding unit size used during the conversion of the video.

17. The method of clause 16, wherein the determining disables use of the TMP due to a height or a width of the unit being equal to the maximum coding unit size.

The following clauses may be implemented together with additional techniques described in items listed in the previous section (e.g., item 7).

18. The method of clause 10, wherein the characteristic of the video unit comprises a height or a width of the video unit, and wherein the determining disables use of TMP due to the height being greater than N or the width being greater that M.

The following clauses may be implemented together with additional techniques described in items listed in the previous section (e.g., item 8).

19. The method of clause 10, wherein the characteristic of the video unit comprises a height or a width of the video unit, and wherein the determining disables use of TMP due to the height being N or the width being M.

The following clauses may be implemented together with additional techniques described in items listed in the previous section (e.g., item 9).

20. The method of clause 10, wherein the characteristic of the video unit comprises a chroma format of the video unit, and wherein the determining disables use of TMP due to the chroma format being a specific format.

21. The method of clause 20, wherein the specific format is 4:0:0.

The following clauses may be implemented together with additional techniques described in items listed in the previous section (e.g., item 10).

22. The method of clause 1, wherein the characteristic of the video unit comprises resolutions of reference pictures used in the conversion of the video unit, and wherein the determining disables use of TMP due to the resolutions being different from each other.

The following clauses may be implemented together with additional techniques described in items listed in the previous section (e.g., item 11).

23. The method of any of above clauses, wherein the coded representation omits a syntax element for TMP syntax elements in case that the TPM mode is determined to be disabled.

24. The method of any of clauses 1 to 23, wherein the conversion comprises encoding the video into the coded representation.

25. The method of any of clauses 1 to 23, wherein the conversion comprises decoding the coded representation to generate pixel values of the video.

26. A video decoding apparatus comprising a processor configured to implement a method recited in one or more of clauses 1 to 25.

27. A video encoding apparatus comprising a processor configured to implement a method recited in one or more of clauses 1 to 25.

28. A computer program product having computer code stored thereon, the code, when executed by a processor, causes the processor to implement a method recited in any of clauses 1 to 25.

29. A method, apparatus or system described in the present document.

The second set of clauses describe certain features and aspects of the disclosed techniques in the previous section (e.g., items 1 to 5).

Figure 16A:
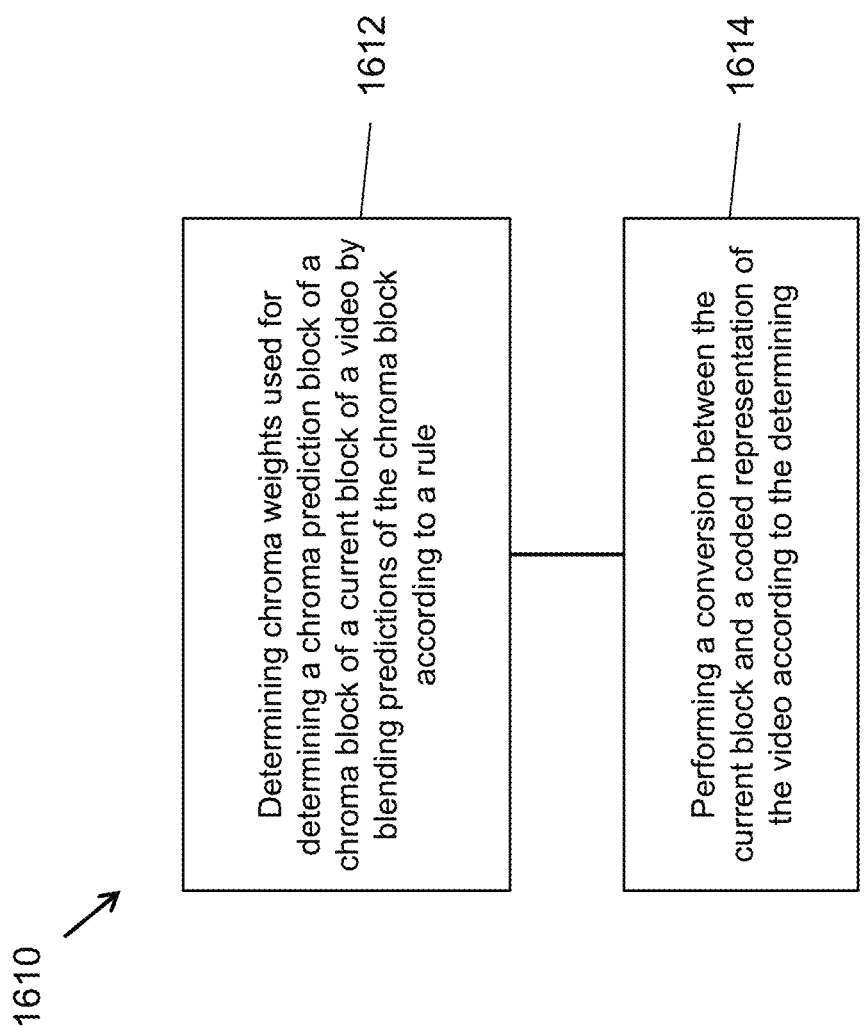

1. A method of video processing (e.g., method 1610 shown in FIG. 16A), comprising: determining (1612) chroma weights used for determining a chroma prediction block of a chroma block of a current block of a video by blending predictions of the chroma block according to a rule, and performing (1614) a conversion between the current block and a coded representation of the video according to the determining, wherein the rule specifies that the chroma weights are determined from luma weights of a collocated luma block of the current block; wherein the current block is coded with a geometric partitioning mode.

2. The method of clause 1, wherein the rule specifies that the chroma weights are a subset of the luma weights.

3. The method of clause 1 or 2, wherein a chroma format of the current block is 4:2:0 or 4:2:2 or 4:4:4.

4. The method of clause 1, wherein the rule specifies that the chroma weights applied to the chroma block with a size of M×N are same as luma weights applied to a luma block of the current block with a size of M×N, whereby M and N are integers greater than 0.

5. The method of clause 4, wherein a chroma format of the current block is 4:4:4.

Figure 16B:
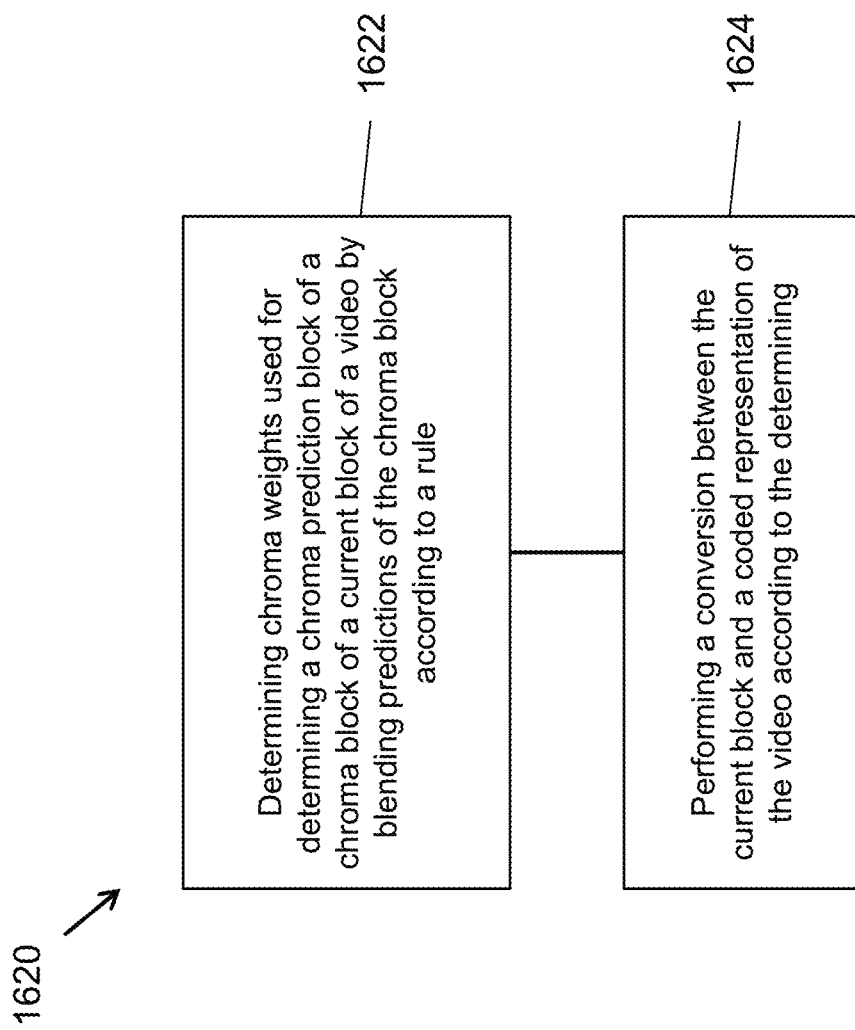

6. A method of video processing (e.g., method 1620 shown in FIG. 16B), comprising: determining (1622) chroma weights used for determining a chroma prediction block of a chroma block of a current block of a video by blending predictions of the chroma block according to a rule; and performing (1624) a conversion between the current block and a coded representation of the video according to the determining, wherein the rule is dependent on a characteristic of a collocated luma block and/or a characteristic of the current block, wherein the current block is coded with a geometric partitioning mode.

7. The method of clause 6, wherein the characteristic of the collocated luma block includes a height and/or width of the collocated luma block, and the characteristic of the current block includes a color format of the current block and/or a chroma subsampling ratio of the current block.

8. The method of clause 6, wherein the rule specifies that, for the chroma block having a 4:4:4 chroma format, the chroma weights are same as luma weights applied to the collocated luma block.

9. The method of clause 6, wherein the rule specifies that, for the chroma block having a 4:2:0 or 4:2:2: chroma format, the chroma weights are subsampled from luma weights applied to the collocated luma block.

10. The method of clause 9, wherein a chroma weight, WeightC[x][y], is calculated by WeightY[f(x)][g(y)], whereby x is an integer between 0 and W/subWidthC−1, y is an integer between 0 and H/subHeightC−1, W and H are a width and a height of the chroma block, subWidthC and subHeightC denote chroma subsampling ratios in width and height directions, respectively, and WeightY[a][b] denotes a luma weight, a is an integer between 0 and W−1 and b is an integer between 0 and H−1.

11. The method of clause 6, wherein the rule specifies that the chroma weights depend on a size of the collocated luma block and are same for different color components.

12. The method of clause 11, wherein a chroma component with a size of W×H uses same weights as a luma component with the size of W×H, whereby W and H are integers that indicate a width and a height of collocated luma block, respectively.

13. The method of clause 6, wherein the rule specifies that the chroma weights depend on a size of the collocated luma block and a color component of the video unit.

14. The method of clause 13, wherein the chroma weights are different for different color components of the video unit.

15. The method of clause 13, wherein the chroma weights are same for two chroma components.

16. The method of any of clauses 6 to 15, wherein the chroma weights and/or the luma weights are integers.

17. The method of clause 16, wherein both odd integer and even integer weights are allowed.

18. The method of any of clauses 6 to 17, wherein the chroma weights and/or the luma weights are clipped to a range [M, N], whereby M and N are integers.

Figure 16C:
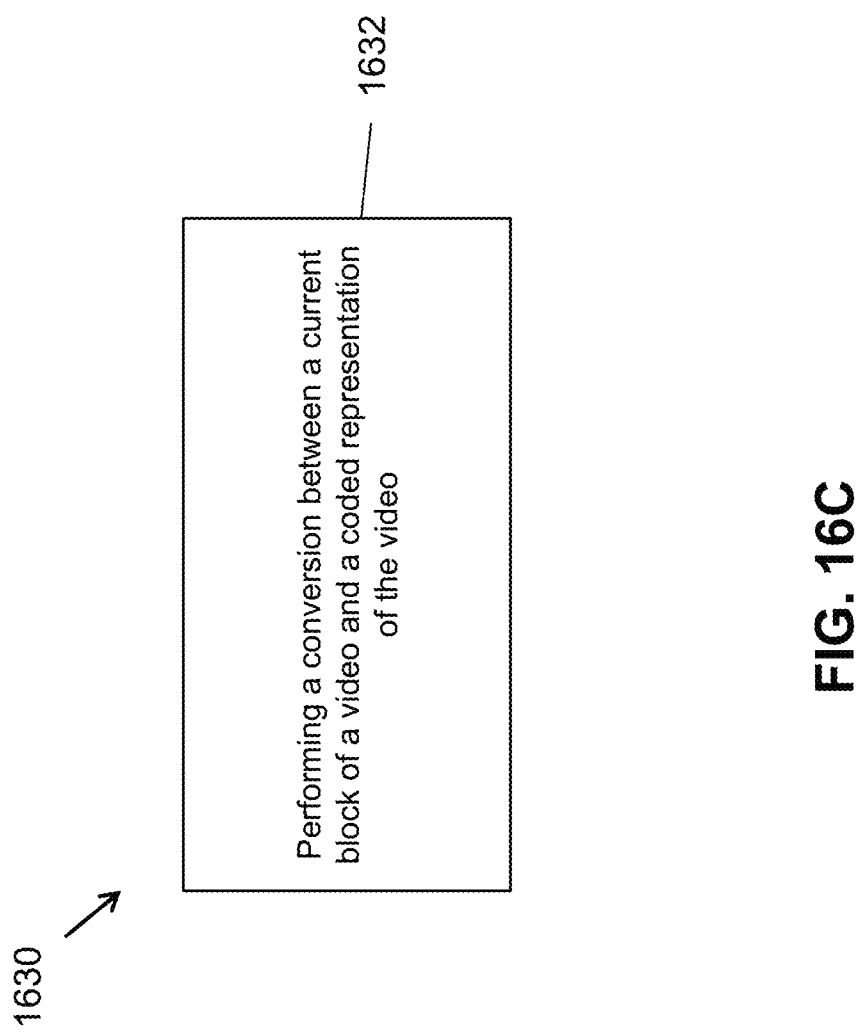

19. A method of video processing (e.g., method 1630 shown in FIG. 16C), comprising: performing (1632) a conversion between a current block of a video and a coded representation of the video, wherein, during the conversion, a prediction block for the current block is determined by blending predictions of the current block according to a blending weight mask, wherein the blending weigh mask is determined according to a rule; wherein the current block is coded with a geometric partitioning mode.

20. The method of clause 19, wherein the rule specifies that the blending weight mask is derived based on one or more predefined tables which contain N elements, whereby N is an integer greater than 0.

21. The method of clause 19, wherein the rule specifies that the blending weight mask is calculated form computing equations.

22. The method of any of clauses 1 to 21, wherein the current block is coded with the geometric partitioning mode in which two or more sub-regions of the current block are obtained by partitioning the current block along an angular partition, horizontal partition, or vertical partition.

23. The method of any of clauses 1 to 22, wherein the conversion includes encoding the video into the coded representation.

24. The method of any of clauses 1 to 22, wherein the conversion includes decoding the coded representation to generate the video.

25. A video processing apparatus comprising a processor configured to implement a method recited in any one or more of clauses 1 to 24.

26. A computer readable medium storing program code that, when executed, causes a processor to implement a method recited in any one or more of clauses 1 to 24.

27. A computer readable medium that stores a coded representation or a bitstream representation generated according to any of the above described methods.

The third set of clauses describe certain features and aspects of the disclosed techniques in the previous section (e.g., items 6 to 14).

1. A method of video processing (e.g., method 1640 shown in FIG. 16D), comprising: determining (1642), for a conversion between a current block of a video and a coded representation of the video, an applicability of a geometric partitioning mode to the current block based on a characteristic of the current block; and performing (1644) the conversion based on the determining.

2. The method of clause 1, wherein the characteristic of the current block comprises a dimension ratio that is obtained as max(H,W)/min(H, W), where max and min are maximum and minimum functions, and H and W are a height and a width of the current block.

3. The method of clause 1, wherein the characteristic of the current block comprises differences between a width and a height of the current block.

4. The method of clause 3, wherein the differences are obtained as Abs(Log 2(cbWidth)−Log 2(cbHeight)), where Abs is absolute function, cbWidth and cbHeight are a width and a height of a coding block including the current block.

5. The method of clause 1, wherein the determining determines that the geometric partitioning mode is disabled due to a ratio between a width (W) and a height (H) of the current block, that is greater than X, whereby X is an integer.

6. The method of clause 5, wherein the determining determines that the geometric partitioning mode is disabled due to the ratio of W/H that is greater than T1, whereby T1 is an integer.

7. The method of clause 6, wherein T1 is equal to 2.

8. The method of clause 5, wherein the determining determines that the geometric partitioning mode is disabled due to the ratio of H/W that is greater than T2, whereby T2 is an integer.

9. The method of clause 8, wherein T2 is equal to 2.

10. The method of clause 1, wherein the characteristic of the current block comprises a maximum transform size used for the conversion of the video.

11. The method of clause 10, wherein the determining determines the geometric partitioning mode is disabled due to the current block having a height or a width greater than the maximum transform size.

12. The method of clause 1, wherein the characteristic of the current block comprises a maximum coding unit size used for the conversion of the video.

13. The method of clause 12, wherein the determining determines the geometric partitioning mode is disabled due to a height or a width of the current block that is equal to the maximum coding unit size.

14. The method of clause 1, wherein the characteristic of the current block comprises a height or a width of the current block, and wherein the determining determines that the geometric partitioning mode is disabled due to the height being greater than N and/or the width being greater that M, whereby N and M are integers.

15. The method of clause 14, wherein N=M=64.

16. The method of clause 1, wherein the characteristic of the current block comprises a height or a width of the current block, and wherein the determining determines that the geometric partitioning mode is disabled due to the height being N and/or the width being M.

17. The method of clause 16, wherein N=M=4.

18. The method of clause 1, wherein the characteristic of the current block comprises a chroma format of the current block, and wherein the determining determines that the geometric partitioning mode is disabled due to the chroma format being a specific format.

19. The method of clause 18, wherein the specific format is 4:0:0, 4:4:4, or 4:2:2.

20. The method of clause 1, wherein the characteristic of the current block comprises resolutions of reference pictures used in the conversion of the current block, and wherein the determining determines that the geometric partitioning mode is disabled due to the resolutions being different from each other.

21. The method of clause 1, wherein the characteristic of the current block comprises resolutions of reference pictures used in the conversion of the current block, and wherein the determining determines that the geometric partitioning mode is disabled due to a resolution of one of the reference pictures being different from a resolution of a current picture including the current block.

22. The method of any of above clauses, wherein the conversion includes determining a prediction block for the current block as a weighted blending of predictions of the two or more sub-regions, and wherein, a single transform is applied to a residual of the current block during encoding or a single inverse transform is applied to coefficients of the current block parsed from the coded representation during decoding.

23. A method of video processing (e.g., method 1630 shown in FIG. 16C), comprising: performing (1632) a conversion between a current block of a video and a coded representation of the video, wherein the coded representation conforms to a format rule that specifies that in case that a geometric partitioning mode is disabled for the current block during the conversion, a syntax element descriptive of the geometric partitioning mode is not included in the coded representation.

24. The method of clause 23, wherein the format rule specifies that, in case that the syntax element is not included in the coded representation, the syntax element is inferred to be 0.

25. The method of clause 23, wherein the format rule specifies that, due to unavailability of the geometric partitioning mode, semantic variables related to the geometric partitioning mode are inferred to be 0.

26. The method of clause 25, wherein the semantic variables include a flag indicative of disablement of the geometric partitioning mode.

27. The method of any of clauses 1 to 26, wherein the current block is coded with the geometric partitioning mode in which two or more sub-regions of the current block are obtained by partitioning the current block along an angular partition, horizontal partition, or vertical partition.

28. The method of any of clauses 1 to 27, wherein the performing of the conversion includes generating the coded representation from the current block.

29. The method of any of clauses 1 to 27, wherein the performing of the conversion includes generating the current block from the coded representation.

30. A video processing apparatus comprising a processor configured to implement a method recited in any one or more of clauses 1 to 29.

31. A computer readable medium storing program code that, when executed, causes a processor to implement a method recited in any one or more of clauses 1 to 29.

32. A computer readable medium that stores a coded representation or a bitstream representation generated according to any of the above described methods.

In the above clauses, the performing the conversion includes using the results of previous decision step during the encoding or decoding operation to arrive at the conversion results.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   determining, during a conversion between a current chroma block of a video and a bitstream of the video, that the current chroma block is coded with a geometric partitioning mode;
   determining a first motion information and a second motion information;
   determining chroma weights used for determining a final chroma prediction for the current chroma block by a blending process; and
   performing the conversion based on the first motion information, the second motion information and the chroma weights, wherein the conversion comprises applying the blending process to generate the final chroma prediction based on a weighted sum of prediction samples derived from the first motion information and the second motion information using the chroma weights, wherein the chroma weights are determined based on a chroma format of the current chroma block indicating a chroma subsampling ratio relative to a collocated luma block of the current chroma block; and wherein a chroma weight, WeightC[x][y], is equal to WeightY[f(x)][g(y)], wherein x is an integer between 0 and W/subWidthC−1, y is an integer between 0 and H/subHeightC−1, W and H are a width and a height of the collocated luma block, subWidthC and subHeightC denote chroma subsampling ratios in width and height directions, respectively, and WeightY[a][b] denotes a luma weight, a is an integer between 0 and W−1 and b is an integer between 0 and H−1.

2. The method of claim 1, wherein for a 4:4:4 chroma format, the chroma weights are same as luma weights applied to the collocated luma block for each position inside the current chroma block.

3. The method of claim 1, wherein for a 4:2:0 or 4:2:2: chroma format, the chroma weights are a subset of luma weights applied to the collocated luma block.

4. The method of claim 1, wherein f(x) is based on x*subWidthC+offsetX, g(y) is based on y*subHeightC+OffsetY, where offsetX and OffsetY are integers.

5. The method of claim 1, wherein the chroma weights are same for two chroma components.

6. The method of claim 1, wherein the chroma weights and the luma weights are integers, and wherein both odd integer and even integer weights are allowed.

7. The method of claim 1, wherein the chroma weights and/or the luma weights are clipped to a range [M, N], wherein M=0 and N=8.

8. The method of claim 1, wherein the geometric partitioning mode is enabled or disabled based on a differences obtained as Abs(Log2(W)−Log2(H)), wherein Abs is absolute function, W and H are a width and a height of the collocated luma block.

9. The method of claim 1, wherein the geometric partitioning mode is disabled due to the collocated luma block having a height greater than N and/or a width greater that M, wherein N=M=64; or due to the collocated luma block having a height equal to S and/or a width equal to T, wherein S=T=4.

10. The method of claim 1, wherein when a syntax element descriptive of a partitioning mode or a first merging candidate index of a geometric partitioning based motion compensation candidate list or a second merging candidate index of the geometric partitioning based motion compensation candidate list is not included in the bitstream, and the syntax element is inferred to be 0.

11. The method of claim 1, wherein the chroma weights and/or the luma weights are calculated from computing equations.

12. The method of claim 1, wherein the conversion includes encoding the video into the bitstream.

13. The method of claim 1, wherein the conversion includes decoding the video from the bitstream.

14. An apparatus for processing video data comprising a processor and a non-transitory memory with instructions thereon, wherein the instructions upon execution by the processor, cause the processor to:

determine, during a conversion between a current chroma block of a video and a bitstream of the video, that the current chroma block is coded with a geometric partitioning mode;

determine a first motion information and a second motion information;

determine chroma weights used for determining a final chroma prediction for the current chroma block by a blending process; and perform the conversion based on the first motion information, the second motion information and the chroma weights, wherein the conversion comprises applying the blending process to generate the final chroma prediction based on a weighted sum of prediction samples derived from the first motion information and the second motion information using the chroma weights, wherein the chroma weights are determined based on a chroma format of the current chroma block indicating a chroma subsampling ratio relative to a collocated luma block of the current chroma block, and wherein a chroma weight, WeightC[x][y], is equal to WeightY[f(x)][g(y)], wherein x is an integer between 0 and W/subWidthC−1, y is an integer between 0 and H/subHeightC−1, W and H are a width and a height of the collocated luma block, subWidthC and subHeightC denote chroma subsampling ratios in width and height directions, respectively, and WeightY[a][b] denotes a luma weight, a is an integer between 0 and W−1 and b is an integer between 0 and H−1.

15. The apparatus of claim 14, wherein for a 4:4:4 chroma format, the chroma weights are same as luma weights applied to the collocated luma block for each position inside the current chroma block;

wherein for a 4:2:0 or 4:2:2: chroma format, the chroma weights are a subset of luma weights applied to the collocated luma block; and wherein f(x) is based on x*subWidthC+offsetX, g(y) is based on y*subHeightC+OffsetY, where offsetX and OffsetY are integers.

16. The apparatus of claim 14, wherein the chroma weights are same for two chroma components;

wherein the chroma weights and the luma weights are integers, and wherein both odd integer and even integer weights are allowed;

wherein the chroma weights and/or the luma weights are clipped to a range [M, N], wherein M=0 and N=8;

wherein the geometric partitioning mode is enabled or disabled based on a differences obtained as Abs(Log2(W)−Log2(H)), wherein Abs is absolute function, W and H are a width and a height of the collocated luma block;

wherein the geometric partitioning mode is disabled due to the collocated luma block having a height greater than N and/or a width greater that M, wherein N=M=64; or due to the collocated luma block having a height equal to S and/or a width equal to T, wherein S=T=4;

wherein when a syntax element descriptive of a partitioning mode or a first merging candidate index of a geometric partitioning based motion compensation candidate list or a second merging candidate index of the geometric partitioning based motion compensation candidate list is not included in the bitstream, and the syntax element is inferred to be 0; and wherein the chroma weights and/or the luma weights are calculated from computing equations.

17. A non-transitory computer-readable storage medium storing instructions that cause a processor to:
- determine, during a conversion between a current chroma block of a video and a bitstream of the video, that the current chroma block is coded with a geometric partitioning mode;
- determine a first motion information and a second motion information;
- determine chroma weights used for determining a final chroma prediction for the current chroma block by a blending process; and
- perform the conversion based on the first motion information, the second motion information and the chroma weights, wherein the conversion comprises applying the blending process to generate the final chroma prediction based on a weighted sum of prediction samples derived from the first motion information and the second motion information using the chroma weights,
- wherein the chroma weights are determined based on a chroma format of the current chroma block indicating a chroma subsampling ratio relative to a collocated luma block of the current chroma block; and
- wherein a chroma weight, WeightC[x][y], is equal to WeightY[f(x)][g(y)], wherein x is an integer between 0 and W/subWidthC−1, y is an integer between 0 and H/subHeightC−1, W and H are a width and a height of the collocated luma block, subWidthC and subHeightC denote chroma subsampling ratios in width and height directions, respectively, and WeightY[a][b] denotes a luma weight, a is an integer between 0 and W−1 and b is an integer between 0 and H−1.

18. The non-transitory computer-readable storage medium of claim 17, wherein for a 4:4:4 chroma format, the chroma weights are same as luma weights applied to the collocated luma block for each position inside the current chroma block;
- wherein for a 4:2:0 or 4:2:2: chroma format, the chroma weights are a subset of luma weights applied to the collocated luma block;
- wherein f(x) is based on x*subWidthC+offsetX, g(y) is based on y*subHeightC+OffsetY, where offsetX and OffsetY are integers;
- wherein the chroma weights are same for two chroma components;
- wherein the chroma weights and the luma weights are integers, and wherein both odd integer and even integer weights are allowed;
- wherein the chroma weights and/or the luma weights are clipped to a range [M, N], wherein M=0 and N=8;
- wherein the geometric partitioning mode is enabled or disabled based on a differences obtained as Abs(Log2 (W)−Log2(H)), wherein Abs is absolute function, W and H are a width and a height of the collocated luma block;
- wherein the geometric partitioning mode is disabled due to the collocated luma block having a height greater than N and/or a width greater that M, wherein N=M=64; or due to the collocated luma block having a height equal to S and/or a width equal to T, wherein S=T=4;
- wherein when a syntax element descriptive of a partitioning mode or a first merging candidate index of a geometric partitioning based motion compensation candidate list or a second merging candidate index of the geometric partitioning based motion compensation candidate list is not included in the bitstream, and the syntax element is inferred to be 0; and
- wherein the chroma weights and/or the luma weights are calculated from computing equations.

19. A non-transitory computer-readable recording medium storing a bitstream of a video which is generated by a method performed by a video processing apparatus, wherein the method comprises:
- determining that a current chroma block of the video is coded with a geometric partitioning mode;
- determining a first motion information and a second motion information;
- determining chroma weights used for determining a final chroma prediction for the current chroma block by a blending process; and
- generating the bitstream based on the first motion information, the second motion information and the chroma weights, wherein the generating comprises applying the blending process to generate the final chroma prediction based on a weighted sum of prediction samples derived from the first motion information and the second motion information using the chroma weights,
- wherein the chroma weights are determined based on a chroma format of the current chroma block indicating a chroma subsampling ratio relative to a collocated luma block of the current chroma block; and
- wherein a chroma weight, WeightC[x][y], is equle to WeightY[f(x)][g(y)], wherein x is an integer between 0 and W/subWidthC−1, y is an integer between 0 and H/subHeightC−1, W and H are a width and a height of the collocated luma block, subWidthC and subHeightC denote chroma subsampling ratios in width and height directions, respectively, and WeightY[a][b] denotes a luma weight, a is an integer between 0 and W−1 and b is an integer between 0 and H−1.

* * * * *